United States Patent
Allen et al.

(10) Patent No.: US 11,156,303 B2
(45) Date of Patent: Oct. 26, 2021

(54) BREAK CHECK VALVE FOR HYDRANT

(71) Applicant: Mueller International, LLC, Atlanta, GA (US)

(72) Inventors: Sean Michael Allen, Chattanooga, TN (US); Michael Louis Broggi, Chattanooga, TN (US); Paul S. Gifford, Chattanooga, TN (US); Timofey Sitnikov, Harrison, TN (US)

(73) Assignee: Mueller International, LLC, Atlanta, GA (US)

( * ) Notice: Subject to any disclaimer, the term of this patent is extended or adjusted under 35 U.S.C. 154(b) by 174 days.

(21) Appl. No.: 16/428,742

(22) Filed: May 31, 2019

(65) Prior Publication Data

US 2020/0378508 A1    Dec. 3, 2020

(51) Int. Cl.
| | | |
|---|---|---|
| *F16K 15/02* | (2006.01) | |
| *F16K 47/02* | (2006.01) | |
| *F16K 15/03* | (2006.01) | |
| *F16K 27/00* | (2006.01) | |
| *F16K 15/18* | (2006.01) | |
| *E03B 9/02* | (2006.01) | |
| *F16K 17/36* | (2006.01) | |

(52) U.S. Cl.
CPC .............. *F16K 15/021* (2013.01); *E03B 9/02* (2013.01); *F16K 15/038* (2013.01); *F16K 15/18* (2013.01); *F16K 27/006* (2013.01); *F16K 47/023* (2013.01); *F16K 17/363* (2013.01)

(58) Field of Classification Search
CPC ...... F16K 15/021; F16K 15/038; F16K 15/18; F16K 47/023; F16K 27/006; F16K 17/363; E03B 9/02
See application file for complete search history.

(56) References Cited

U.S. PATENT DOCUMENTS 2,054,561 A * 9/1936 Greenberg .............. F16K 15/03
                                                                   137/68.14
2,717,001 A * 9/1955 Perrault .................. F16K 25/02
                                                                   137/514

(Continued)

OTHER PUBLICATIONS

Mueller; Brochure for Jones Tell-Tale Break-Off Check Valve, published Oct. 2018, 1 pg.

(Continued)

*Primary Examiner* — Kenneth Rinehart
*Assistant Examiner* — Patrick C Williams
(74) *Attorney, Agent, or Firm* — Taylor English Duma LLP

(57) ABSTRACT

A hydrant includes: a hydrant body defining a hydrant inner cavity, the hydrant configured to couple to and be in fluid communication with a fluid distribution system including a fluid therein under pressure; and a break check valve coupled to the hydrant body, the valve including: a valve body defining a valve inner cavity, the hydrant inner cavity defining a valve bore in fluid communication with the fluid during normal operation of the hydrant; a valve member configured to rotate from an open position to a closed position of the valve; and an arm in contact with the hydrant and configured to prevent movement of the valve member when the hydrant is coupled to the valve, the valve defining a hole separate from the valve bore and in fluid communication with each of the hydrant inner cavity and the valve inner cavity.

20 Claims, 24 Drawing Sheets

(56) References Cited

U.S. PATENT DOCUMENTS

| | | | |
|---|---|---|---|
| 2,923,317 A | 2/1960 | McInerney | |
| 3,831,429 A | 8/1974 | Kmiecik | |
| 4,596,263 A * | 6/1986 | Snider | E03B 9/04 137/493.3 |
| 5,010,919 A | 4/1991 | Partridge | |
| 5,301,709 A | 4/1994 | Gasaway | |
| 5,509,437 A * | 4/1996 | Merrett | E02B 9/04 137/15.02 |
| 5,609,179 A * | 3/1997 | Knapp | E03B 9/04 137/68.11 |
| 5,711,343 A | 1/1998 | Beckett | |
| 6,851,255 B2 | 2/2005 | Aitchison et al. | |
| 7,152,622 B2 | 12/2006 | Scaramucci et al. | |
| 8,991,415 B1 * | 3/2015 | Luppino | E03B 9/04 137/68.14 |
| 9,347,573 B2 | 5/2016 | Feng et al. | |
| 9,353,878 B2 | 5/2016 | Plummer et al. | |
| 9,890,866 B2 | 2/2018 | Kitchen et al. | |
| 10,228,070 B2 | 3/2019 | Minta | |
| 10,407,882 B2 | 9/2019 | Kitchen et al. | |
| 2005/0224114 A1 * | 10/2005 | Cook | F16K 17/406 137/68.14 |
| 2007/0044847 A1 | 3/2007 | Yang | |
| 2007/0256740 A1 | 11/2007 | Sugai et al. | |
| 2008/0135100 A1 * | 6/2008 | Davidson | E03B 9/16 137/15.02 |
| 2015/0240962 A1 * | 8/2015 | Plummer | E03B 9/02 137/300 |
| 2016/0265197 A1 | 9/2016 | Kitchen et al. | |
| 2018/0171606 A1 | 6/2018 | Kitchen et al. | |

OTHER PUBLICATIONS

Mueller; Installation Instructions for J-5000 Break Check Valve, published Oct. 2018, 1 pg.

Clow Valve Co.; Images of Clow Valve, publicly available prior to May 31, 2019, 3 pgs.

Clow Valve Co.; Brochure for LP619 Break-Off Check Valve, publicly available by Aug. 27, 2019, 2 pgs.

Clow Valve Co. Specification Sheet for LP619 Low Profile Break Off Check Valve, publicly available by Aug. 27, 2019, 1 pg.

Allen, Sean Michael; Applicant-Initiated Interview Summary for U.S. Appl. No. 16/824,147, filed Mar. 19, 2020, dated Feb. 16, 2021, 8 pgs.

Allen, Sean Michael; Non-Final Office Action for U.S. Appl. No. 16/824,147, filed Mar. 19, 2020, dated Jan. 21, 2021, 20 pgs.

Allen, Sean Michael; Applicant-Initiated Interview Summary for U.S. Appl. No. 16/824,147, filed Mar. 19, 2020, dated Jul. 2, 2021, 7 pgs.

Allen, Sean Michael; Final Office Action for U.S. Appl. No. 16/824,147, filed Mar. 19, 2020, dated May 18, 2021, 19 pgs.

Allen, Sean Michael; Notice of Allowance for U.S. Appl. No. 16/824,147, filed Mar. 19, 2020, dated Mar. 16, 2021, 7 pgs.

Allen, Sean Michael; Supplemental Notice of Allowance for U.S. Appl. No. 16/824,147, filed Mar. 19, 2020, dated Sep. 2, 2021, 6 pgs.

\* cited by examiner

BREAK CHECK VALVE FOR HYDRANT

TECHNICAL FIELD

Field of Use

This disclosure relates to hydrants. More specifically, this disclosure relates to break check valves for hydrants and particularly wet barrel hydrants.

Related Art

Property damage and water loss can occur when a hydrant—in particular a wet barrel fire hydrant—is hit by a moving vehicle or otherwise broken free from its usual position in a water distribution system. While an in-line valve could mitigate such property damage and water loss, such valves can be large and cumbersome, expensive, and ineffective in one way or another. Because of the number of hydrants in a typical water distribution system, an overly complex break check valve can be impractical. Moreover, overly rapid closure of such a valve can cause not only water hammer but also a pressure spike resulting in an excessive load on the components of the system sufficient in some cases to cause a failure of one or more of those components.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a hydrant comprising: a hydrant body defining a hydrant inner cavity, the hydrant configured to couple to and be in fluid communication with a fluid distribution system comprising a fluid therein under pressure; and a break check valve coupled to the hydrant body, the valve comprising: a valve body defining a valve inner cavity, the hydrant inner cavity defining a valve bore in fluid communication with the fluid during normal operation of the hydrant; a valve member configured to rotate from an open position to a closed position of the valve; and an arm in contact with the hydrant and configured to prevent movement of the valve member when the hydrant is coupled to the valve, the valve defining a hole separate from the valve bore and in fluid communication with each of the hydrant inner cavity and the valve inner cavity.

In a further aspect, disclosed is a break check valve for a hydrant, the valve comprising: a valve body comprising a mating surface and an inner surface defining a valve bore; a valve member positioned within the valve body and configured to rotate about a pivot pin from an open position to a closed position of the valve, the valve member configured to remain in the open position of the valve as long as a mating surface of a hydrant substantially matching the mating surface of the valve body remains in contact with the mating surface of the valve body, the valve member further configured to close when the mating surface of the hydrant is separated from the mating surface of the valve body; and an arm extending from the valve member, the valve defining a hole separate from the valve bore and in fluid communication with each of the hydrant inner cavity and the valve inner cavity.

In yet another aspect, disclosed is a method for using a hydrant, the method comprising: providing a wet barrel hydrant comprising a hydrant body and a hydrant break check valve coupled to the hydrant and positioned below the hydrant, the hydrant defining a hydrant inner cavity and the valve defining an valve inner cavity defining a valve bore, each of the hydrant and the valve coupled to a fluid distribution system comprising a fluid therein under pressure; rotating a valve member of the valve from an open position to a closed position of the valve when the hydrant is separated from the valve, the valve member before closure positioned inside a valve body of the valve, the valve member during closure changing its position with respect to the valve body of the valve, the valve member in the closed position of the valve substantially stopping flow of the fluid from the fluid distribution system; and expelling a limited stream of water from the valve in the closed position through a hole defined in the valve, the hole separate from the valve bore and in fluid communication with each of the hydrant inner cavity and the valve inner cavity to indicate closure of the valve.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
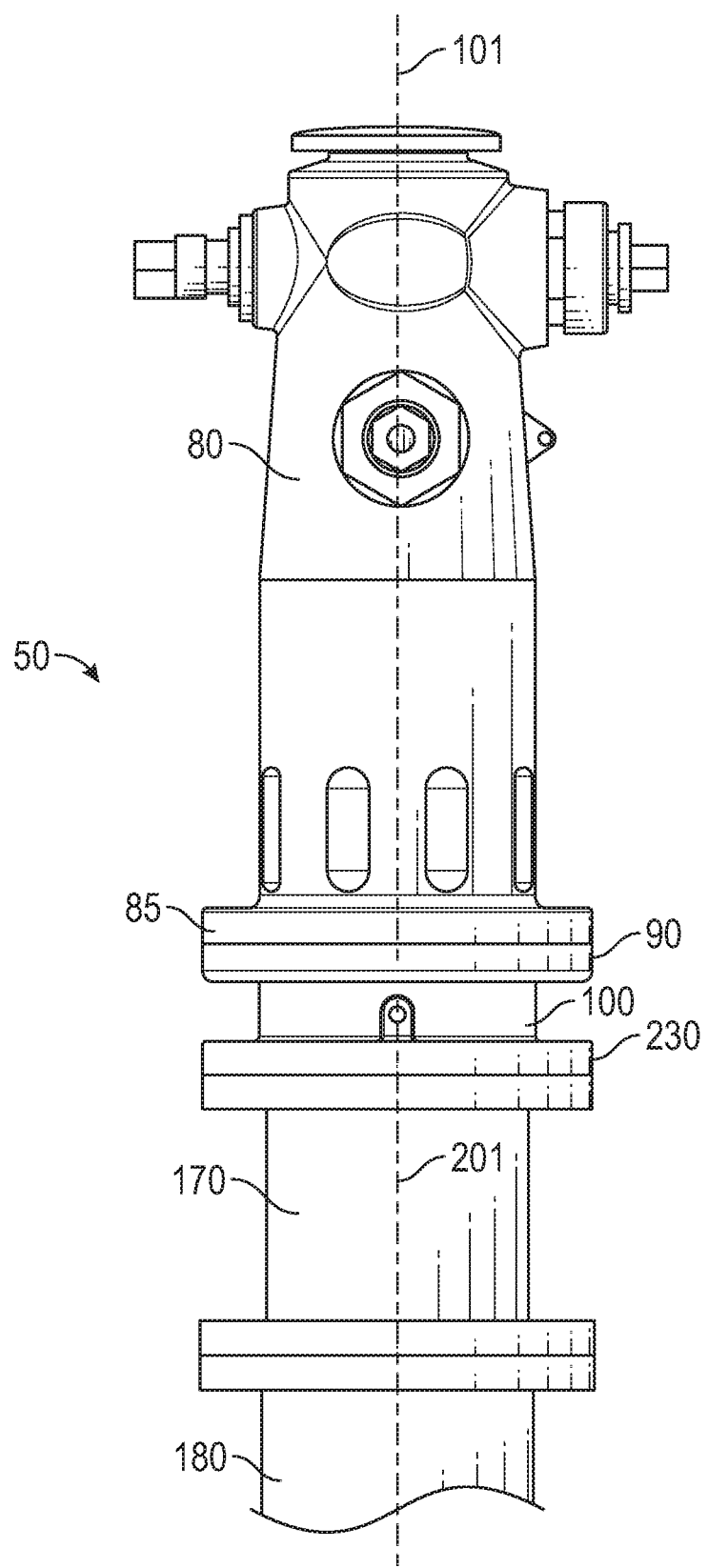
FIG. 1 is a side view of a hydrant assembled to a break check valve in accordance with one aspect of the current disclosure and together assembled to a water distribution system.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the hydrant shown in FIG. 1; "rear" is that end of the hydrant that is opposite or distal the front; "left" is that which is to the left of or facing left from the position of the hydrant as oriented in FIG. 1; and "right" is that which is to the right of or facing right from the position of the hydrant as oriented in FIG. 1. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a break check valve for a hydrant and associated methods, systems, devices, and various apparatuses are disclosed herein. In one aspect, the break check valve can comprise an arm, a valve member, and/or a dampener and can define a hole in fluid communication with an inner cavity of each of the hydrant and the valve.

FIGS. 1-5 shows a hydrant 80 assembled to a break check valve 100 in accordance with one aspect of the current disclosure. FIG. 1 specifically is a side view of the hydrant 80 assembled to the valve 100 along an axis 101 of the hydrant 80 and an axis 201 of the valve 100, each of which can be a longitudinal axis of the hydrant 80 and the valve 100, respectively. The hydrant 80 and the break check valve 100 can form a portion of a fluid or water distribution system 50, which can comprise and contain a fluid under pressure, such as water. The hydrant 80 can be secured to a top flange 220 (shown in FIG. 2) of the break check valve 100 with a frangible connection such as, for example and without limitation, a traffic flange 90. The traffic flange 90 can be secured to the hydrant 80 with fasteners (not shown) such as, for example, through-bolts configured to extend through mounting holes (not shown) defined in each of the traffic flange 90 and mounting holes 1680 (shown in FIG. 16) defined in a mounting flange 85 of the hydrant 80. The break check valve 100, and specifically a bottom flange 230 thereof, can itself be secured to a pipe fitting 170 or a pipe fitting 180, where either of the pipe fittings 170,180 can be any one of a variety of components of the system 50 such as, for example and without limitation, an extension barrel, a hydrant shoe, and simply a pipe of some length adequate to connect to another portion of the system 50. The fasteners can extend, for example, through mounting holes 1685 (shown in FIG. 16) defined in the bottom flange 230 and mounting holes (not shown) defined in a one of the pipe fittings 170,180. The hydrant 80 can be configured to couple to and be in fluid communication with these and other portions of the system 50.

Even while still assembled to the mounting flange 85 of the hydrant 80, the traffic flange 90 can be configured to fail before other components of the system 50 and permit complete dislocation of the hydrant 80 from the system 50 upon impact to the hydrant 80 by an object such as a moving vehicle (in other words, when the hydrant 80 is run over and knocked off by the vehicle). Because the traffic flange 90 is frangible, the valve 100 itself and other components of the system 50 need not be frangible themselves.

As shown, the hydrant 80 can be a wet barrel hydrant. In a wet barrel hydrant during its normal operation, a hydrant inner cavity 1602 (shown in FIG. 16) is filled with a fluid of the system 50—again, typically water in the case of the hydrant 80. Also in a wet barrel hydrant during its normal operation, a valve inner cavity 214 (shown in FIG. 16) is in fluid communication with both the hydrant inner cavity 1602 and an inner cavity 1604 (shown in FIG. 16) of the pipe fitting 180 and the break check valve 100 is open or unactuated.

Figure 2:
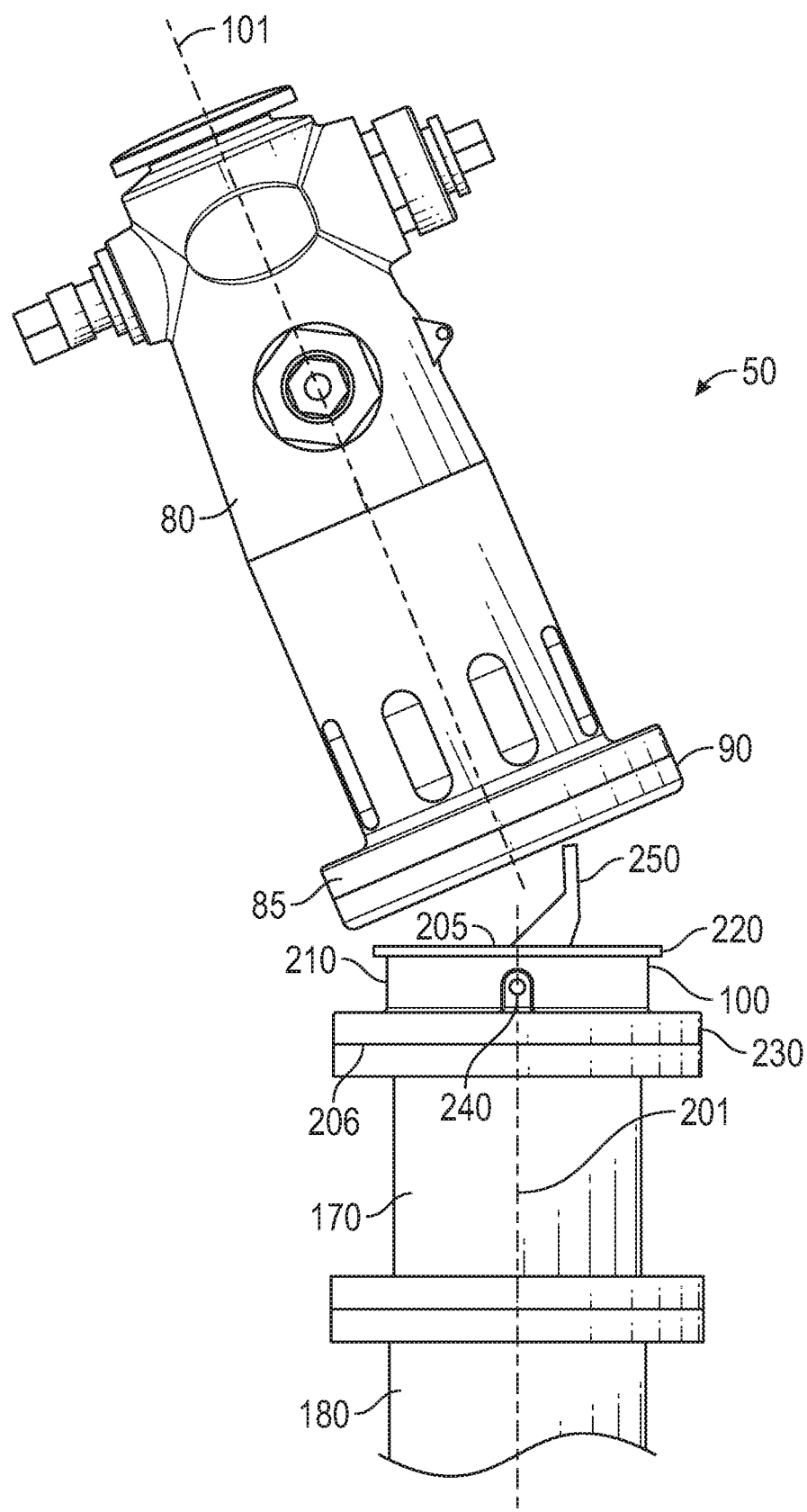
FIG. 2 is a side view of the hydrant of FIG. 1 after its dislocation from the break check valve of FIG. 1.

FIG. 2 is a side view of the hydrant 80 after its dislocation from the break check valve 100. The valve 100 can comprise a valve body 210 and a valve member 250 configured to move inside the valve body 210 of the break check valve 100 about a pivot shaft or pivot pin 240. The pivot pin 240 can extend through the valve member 250, which can be configured to rotate about the pivot pin 240 from an open or unactuated position A (shown in FIG. 4) to a closed or actuated position B (represented by a dotted line in FIG. 4).

Dislocation of the hydrant 80, which can result from the aforementioned impact by a moving vehicle but can also result from other circumstances, could cause significant water loss were it not for immediate actuation or closure of the break check valve 100. Without the break check valve 100, this water loss is possible because the hydrant 80, at least when it is a wet barrel hydrant, is filled or pressurized with water. In some aspects, as shown, closure of the break check valve 100 can be evident by rotation of the valve member 250 inside the valve body 210 about the pivot pin 240. As shown, a disc or plate 450 (shown in FIG. 4) of the valve 100 can be centered in the valve 100 and aligned with or along the axis 201, and the pivot pin 240 can extend orthogonally through the axis 201. The valve 100 can define a first end 205 and a second end 206 distal from the first end 205.

Figure 3:
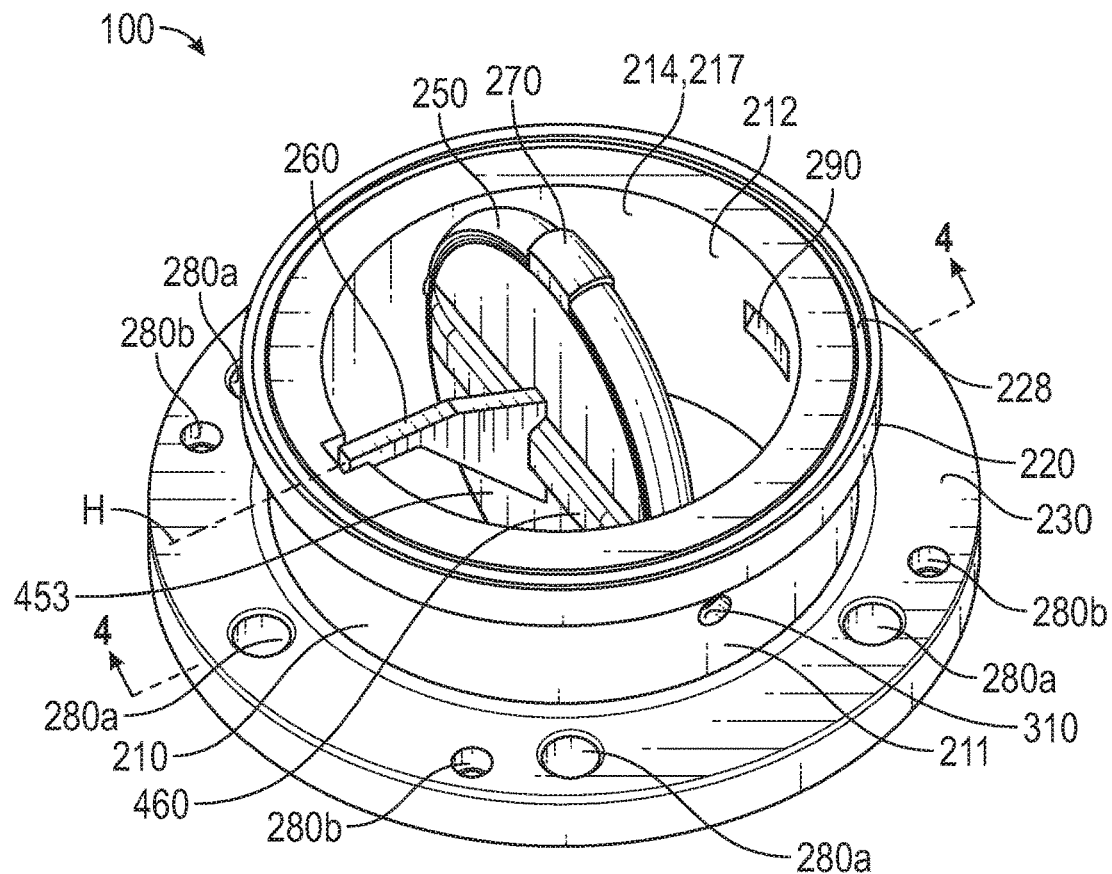
FIG. 3 is a top perspective view of the break check valve of FIG. 1 in an open position, which can be an unactuated position.
Figure 4:
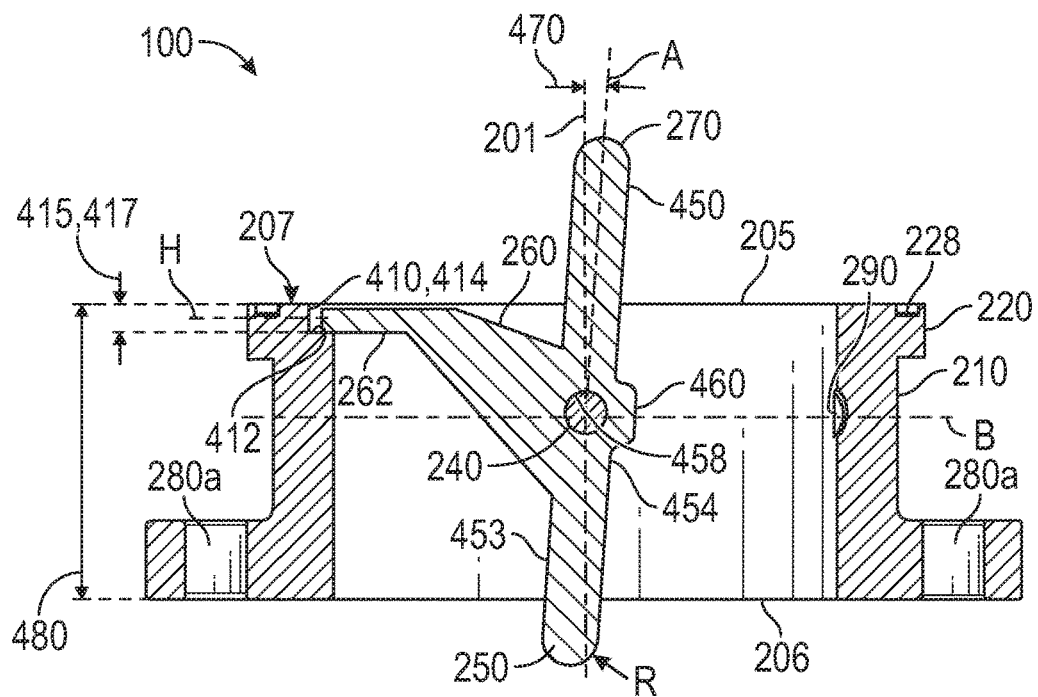
FIG. 4 is a sectional side view of the break check valve of FIG. 1 in the open position taken along line 4-4 of FIG. 3.

FIG. 3 is a top perspective view of the break check valve 100 in the open position A (shown in FIG. 4). The break check valve 100 can comprise the valve body 210, which can define an outer surface 211 and an inner surface 212. The valve body 210 can further define a valve inner cavity 214 defining a valve bore 217. In some aspects, as shown, the valve body 210 can define mounting holes 280a (defining a first hole pattern) and mounting holes 280b (defining a second hole pattern) in the bottom flange 230. The valve member 250 can define an arm 260, which can rest on the valve body 210 in a horizontal position H when the valve member 250 is in the open position A. The valve member 250 can define a tab 270, which can rest on the valve body 210—and specifically in a detent or stop 290 defined in the valve body 210—when the valve 100 is in the closed position B (shown in FIG. 4). The valve body 210 can define a groove or recess 228, which can be sized to receive a seal (not shown), such as an O-ring or any other type of annular gasket, for sealing between the valve 100 and the hydrant 80 when assembled together. The valve body 210 can define a pivot bore 310, which can be defined as a cylindrical bore and within which the pivot pin 240 can rotate.

FIG. 4 is a sectional side view of the break check valve 100 in the open position A.

While the hydrant 80 is not shown in FIG. 4, the valve 100 is shown with the valve member 250 in the open position A as if the mounting flange 85 (shown in FIG. 1) of the hydrant 80 were mated to a mating surface 207 of the valve body 210 of the valve 100 and holding down the arm 260 of the valve member 250. The arm 260 can be in contact with the mounting flange 85 of the hydrant 80 and can be configured to prevent movement of the valve member 250 in a clockwise direction from the open position A to the closed position B when the hydrant 80 is coupled to the valve 100. To prevent rotation of the arm 260 beyond the horizontal position H in a counterclockwise direction, the valve body 210 can define a pocket or stop notch 410 proximate to the first end 205. As shown, the valve 100 can define an installation height 480 measured from the first end 205 to the second end 206. When the valve member 250 is in the open position A, a plane defined by the valve member 250 can be aligned with the open position A. The same plane can be aligned with the valve member 250 when the valve member 250 is in the closed position B.

The stop notch 410 can be sized to receive a distal portion or pin or tip 262 of the arm 260. More specifically, the stop notch 410 can define a bottom 412 and a side wall 414 and can be sized to receive the tip 262 of the arm 260. Each of a height 415 of the side wall 414 of the stop notch 410 and a distance 417 from the bottom 412 of the stop notch 410 to the mating surface 207 of the valve body 210 can be at least a thickness 510 (shown in FIG. 5) of the tip 262 of the arm 260.

The valve member 250 can comprise the disc or plate 450, which can define a first side 453 and a second side 454 and can rotate about the pivot pin 240. In some aspects, a pivot bore 458 of the valve member 250 can be sized to receive the pivot pin 240 with an interference fit and the valve member 250 and the pivot pin 240 can rotate together inside the valve body 210. In other aspects, the pivot bore 458 of the valve member 250 can be sized to receive the pivot pin 240 with a looser non-interference fit and the valve member 250 can as a result rotate with respect to the pivot pin 240.

The plate 450, which in some aspects can be a single disc as shown, can be oriented at a bias angle 470 with respect to the axis 201 of the valve 100. By being oriented at the bias angle 470, the valve member 250 is positioned to close naturally and automatically in a desired direction (towards the closed position B) upon dislocation of the hydrant 80. This is because a fluid pressure or water pressure inside the system 50 and normally acting inside the valve 100 and the hydrant 80, instead of pushing up against the first side 453, which faces away from the second end 206 of the valve body 210, pushes up against the second side 454 of the plate 450. The plate 450 can define a radius R on a perimeter or circumference thereof, including at the tab 270. The plate 450 can define a thickened portion 460, which can be thickened related to other portions of the plate 450 to strengthen the plate 450 proximate to the pivot bore 458. The thickened portion 460 can extend from and define either or both of the first side 453, as shown in FIG. 3, and the second side 454. As shown, the arm 260 and the plate 450 of the valve member 250 can be formed as a monolithic component of the valve 100 or be monolithic with respect to each other, where "monolithic" means at least to be cast, molded, or otherwise formed as a single piece. More specifically, each monolithic component can be formed from a single material in a single operation and without any welds or mechanical connections such as threading, flanges, fasteners, interference fits, adhesives, brazing, soldering, or other mechanical methods of connection, at least to join the features described as being monolithic.

Figure 5:
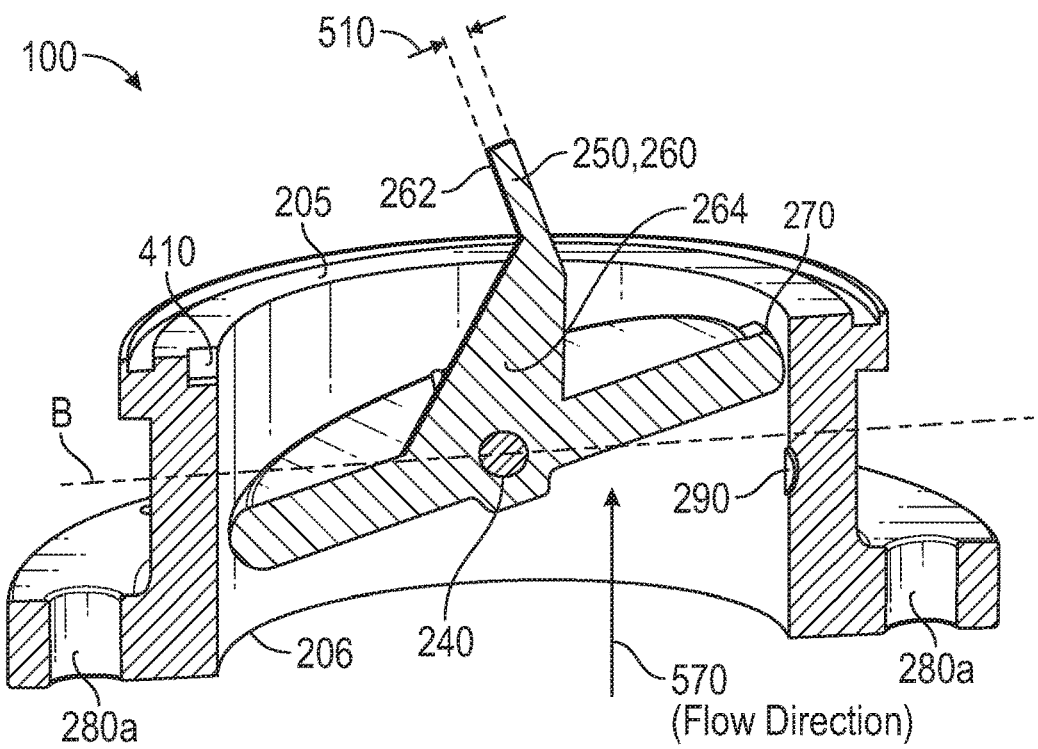
FIG. 5 is a sectional perspective view of the break check valve of FIG. 1 proximate to a closed position, which can be an actuated position, also taken along line 4-4 of FIG. 3.

FIG. 5 is a sectional perspective view of the break check valve 100 with the valve member 250 in a position proximate to but not yet in the closed position B (shown in FIG. 4). The tab 270 is also proximate to the stop 290 and can stop rotation of the valve member 250 upon contact with the stop 290. When the valve member 250 is in the closed position B, the arm 260 of the valve member 250 can be oriented substantially vertically, at an angle substantially orthogonal to the horizontal position H, or at the bias angle 470 (shown in FIG. 4). As shown, a proximal portion or base 264 of the arm 260 can be wider than the tip 262 of the arm 260 to, for example, increase resistance to bending of the arm 260 when under a mechanical load. As shown, each side of the valve member 250 can define the same surface area, which can result in the valve member 250 remaining in or around the closed position B once the valve 100 actuates or closes.

In some aspects, the valve member 250 and the valve body 210 of the valve 100 can define a gap therebetween such as around a perimeter of the valve member 250. Such a gap can allow the valve to expel a stream of water from the valve 100, even though the valve 100 is closed, for reasons discussed below. In some aspects, the gap generally or a gap between the tab 270 and the stop 290 (or both gaps) can be made tight enough that initial closing of the valve member 250 will drive the valve member 250 into the stop 290 and friction will help maintain the valve member 250 in the closed position B even when, for example, the flow of fluid in the system from the valve in a typical flow direction 570 and around the valve 100 is turbulent due to the system 50 being breached by the dislocation of the hydrant 80.

Figure 6:
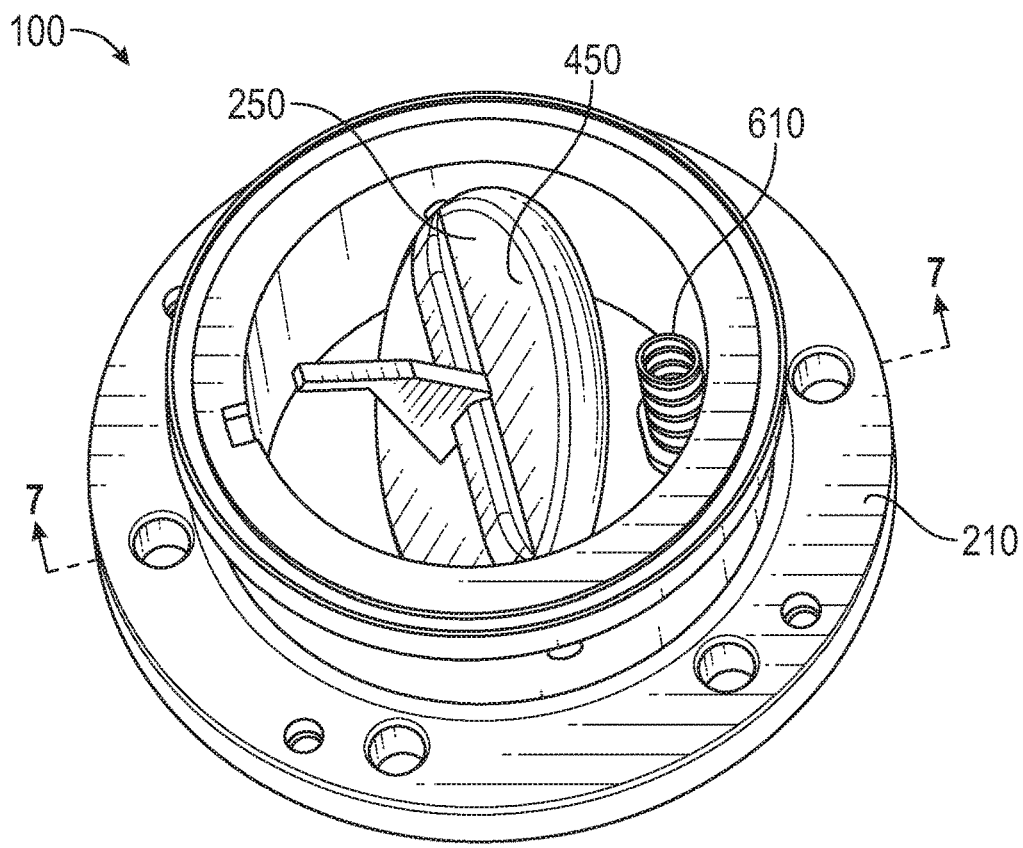
FIG. 6 is a top perspective view of a break check valve in accordance with another aspect of the current disclosure in a partially closed position.
Figure 7:
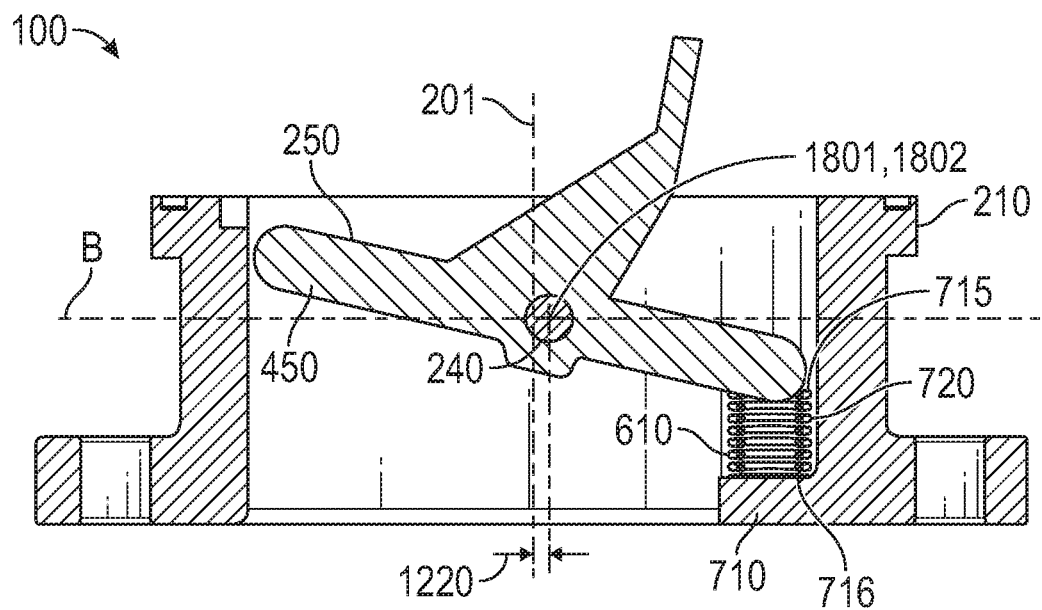
FIG. 7 is a sectional side view of the break check valve of FIG. 6 in a closed position.

FIGS. 6 and 7 show the break check valve 100 in accordance with another aspect of the current disclosure. FIG. 6 specifically is a top perspective view of the break check valve 100 shown while in a partially closed position. In some aspects, as shown, the plate 450 can be an offset plate or offset disc in which the pivot pin 240 defines an axis that is offset from a center of the valve or, more specifically, the axis 201 by an offset distance 1220 (shown in FIG. 7). As shown, the valve 100 can comprise a dampener 610, which can be configured to slow a rotational speed of the valve member 250 proximate to the closed position B. In some aspects, the dampener 610 can comprise a biasing member 720 (shown in FIG. 7) such as, for example and without limitation, a coil spring. In some aspects, as shown, the biasing member 720 can be more specifically a compression spring. In other aspects, the biasing member 720 can be another type of spring configured to stop the movement of the valve member 250. In some aspects such as those involving the compression of a mechanical element that stores and then releases energy (e.g., the biasing member 720), the dampener 610 can be a mechanical dampener configured to mechanically dampen the valve member 250 of the valve 100.

FIG. 7 is a sectional side view of the break check valve 100 of FIG. 6 with the valve member 250 proximate to and angularly past the closed position B. The valve body 210 can comprise a support pad 710, which can support the dampener 610 as shown. The dampener 610 can define a first end 715 and a second end 716. The valve member 250 can contact the first end 715 of the dampener 610, and the second end 716 can contact and be supported by the support pad 710. Moreover, the dampener 610 can extend vertically upward away from the support pad 710, and the stop notch 410 can be positioned on an opposite side of the valve body from the dampener 610. By not only contacting but also compressing the dampener 610, the dampener 610 can slow down the rotation of the valve member 250 and thereby cushion closing of the valve 100. Under normal pressures in the system 50, the dampener 610 can stop the valve member 250 from over-rotating past the closed position B. As shown, in the process of slowing the rotation of the valve member 250 the dampener 610 can allow the dampener 610 and specifically the biasing member 720 to compress or otherwise change shape more than it would under normal conditions and can allow the valve member 250 to rotate beyond the closed position B and then return to the closed position B after energy stored by the dampener 610 during rotation of the valve member beyond the closed position B pushes the valve member 250 back to the closed position B. Over-rotation of the valve member 250 can have a further benefit of allowing some fluid in the system 50 to escape from the valve, relieving the pressure in the system 50, especially when there is a pressure spike. This way, the valve 100 can act as a pressure relief valve, which can reduce the water pressure from what it otherwise would be with the hydrant 80 dislocated from the system 50.

In various aspects disclosed above and below, slowing the closing speed of the plate 450, the valve member 250, and the valve 100 overall can reduce the risk of water hammer occurring in the system 50 upon the closing of the valve 100. Water hammer can result from an overally rapid deceleration of fluid within the system 50 such as may occur when a valve such as the valve 100 closes. Such rapid deceleration of the valve member 250 from quickly stopping or slowing the momentum of the fluid can cause not only water hammer but also a pressure spike resulting in an excessive load on the components of the system 50 sufficient in some cases to cause failures of those components, especially when aged or otherwise compromised. Slowing the valve member 250 can dissipate the energy of the moving fluid or the momentum of the fluid and lower or limit the pressure spike experienced by the system 50 at final closure of the valve 100.

Figure 8:
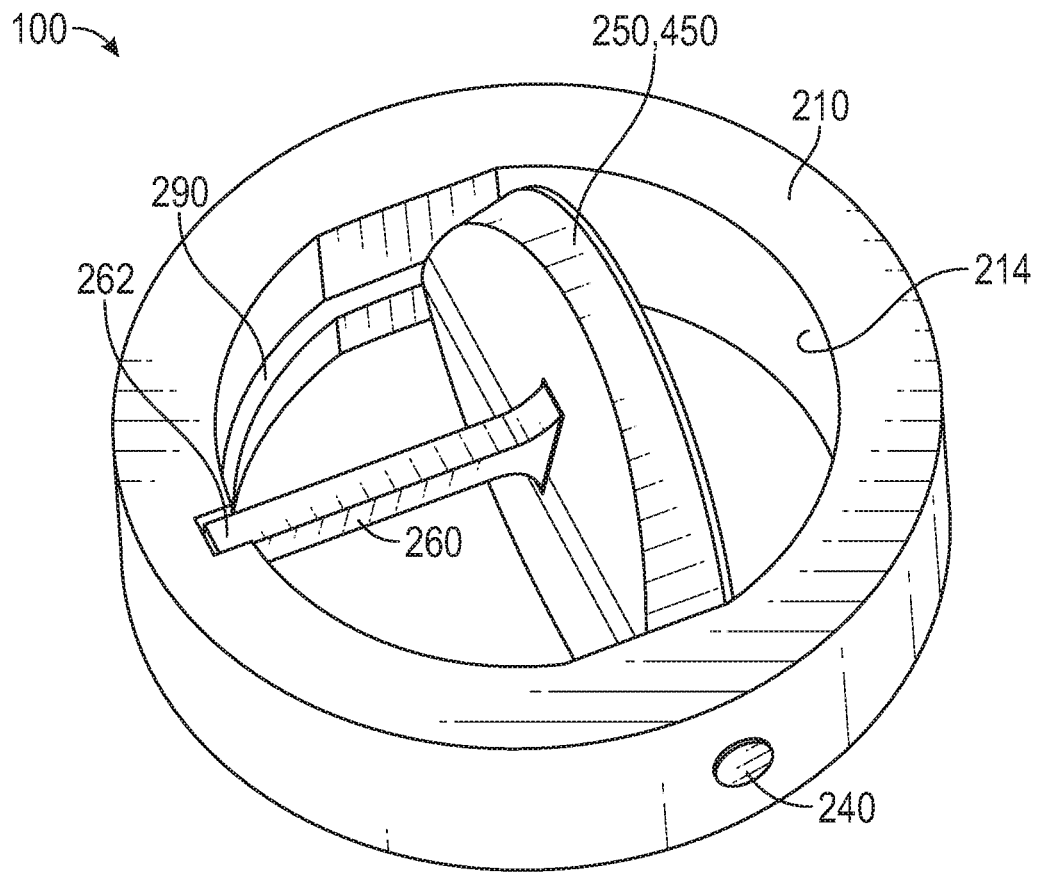
FIG. 8 is a top perspective view of a break check valve in accordance with another aspect of the current disclosure in an open position.

FIGS. 8-12 show the break check valve 100 in accordance with another aspect of the current disclosure. FIG. 8 specifically is a top perspective view of the break check valve 100 shown while in an open position. As shown, the valve body 210 can be formed without either of the top flange 220 or the bottom flange 230 (both shown in FIG. 3). The valve body 210, however, can define the stop 290, which can be a ledge or flange extending from the valve bore 217.

Figure 9:
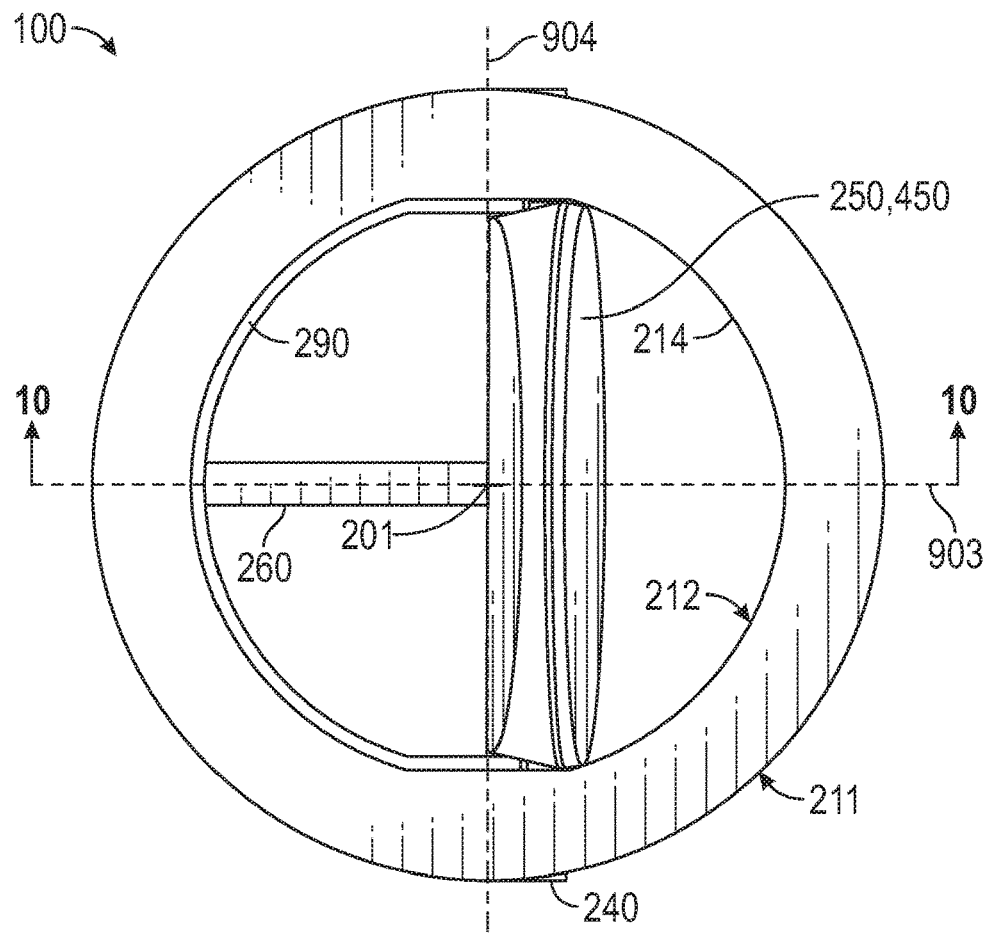
FIG. 9 is a top view of the break check valve of FIG. 8.

FIG. 9 is a top view of the break check valve 100 of FIG. 8. As shown, the arm 260 can be aligned with a centerline of the plate 450 and with a first transverse axis 903 of the valve body 210. Both a center of the plate 450 and the pivot pin 240 can be offset along a direction of the first transverse axis 903 from a second transverse axis 904 and from the axis 201.

Figure 10:
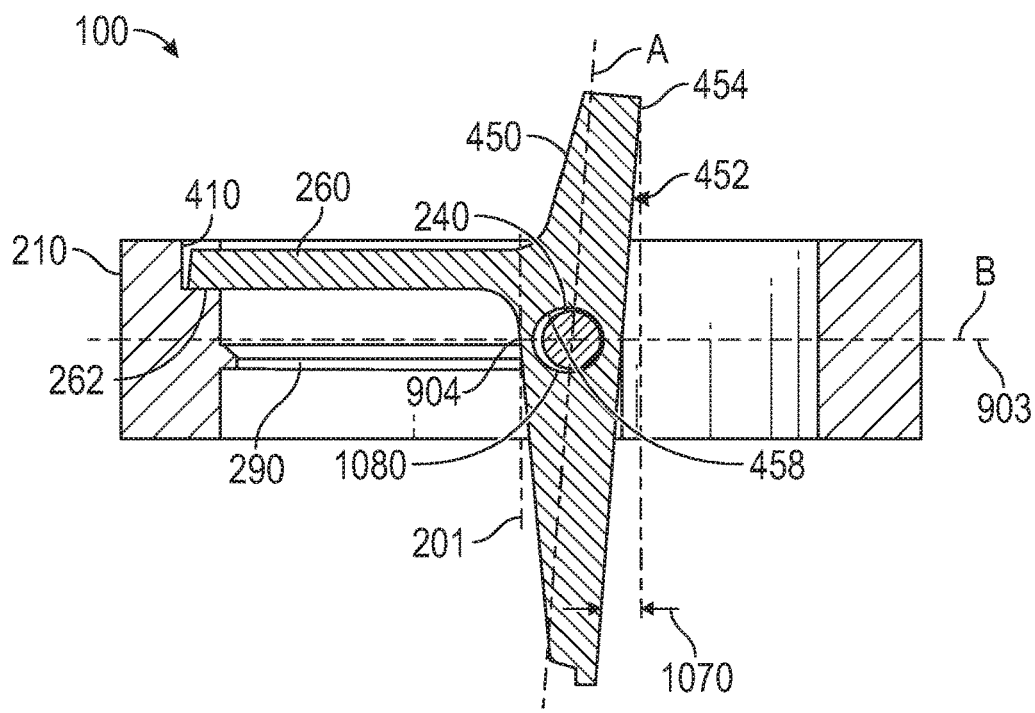
FIG. 10 is a sectional view of the break check valve of FIG. 8 taken along line 10-10 of FIG. 9 and shown in an open position.

FIG. 10 is a sectional view of the break check valve 100 of FIG. 8 while in the open position A. A second side surface 452 of the second side 454 of the plate 450 of the valve member 250 can be angled at a bias angle 1070 with respect to a direction aligned with the axis 201 of the valve 100. Whether or not the plate 450 itself is angularly biased towards the first transverse axis 903 or the closed position B, similarly as discussed above, orienting the second side surface 452 at the bias angle 1070 can position the valve member 250 to close naturally and automatically upon dislocation of the hydrant 80 similar to biasing or angling some other portion of the plate 450 of the valve member 250. As shown, the pivot pin 240 and the pivot bore 458 can define a gap 1080 therebetween. In fact, the pivot bore 458 can be elongated with respect to the pivot pin 240 or with a larger diameter than necessary to simply permit rotation of the plate 450 with respect to the pivot pin 240 to ensure that the valve member 250 will rotate about the pivot pin 240 without any hesitation due to friction or due to binding by any other means during operation of the valve 100. As shown, the tip 262 of the arm 260 can be sloped or angled with respect to a longitudinal direction of the arm 260 to ensure that the arm 260 does not catch or hang on any portion of the stop notch 410 during opening or closing of the valve 100.

Figure 11:
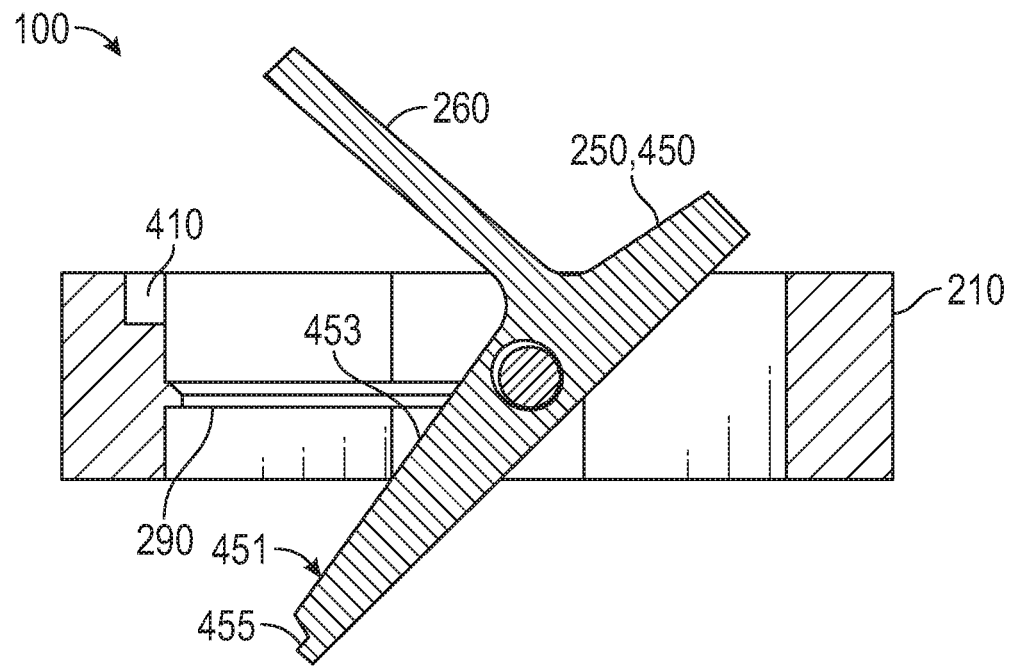
FIG. 11 is a sectional view of the break check valve of FIG. 8 taken along line 10-10 of FIG. 9 and shown in a partially closed position.
Figure 12:
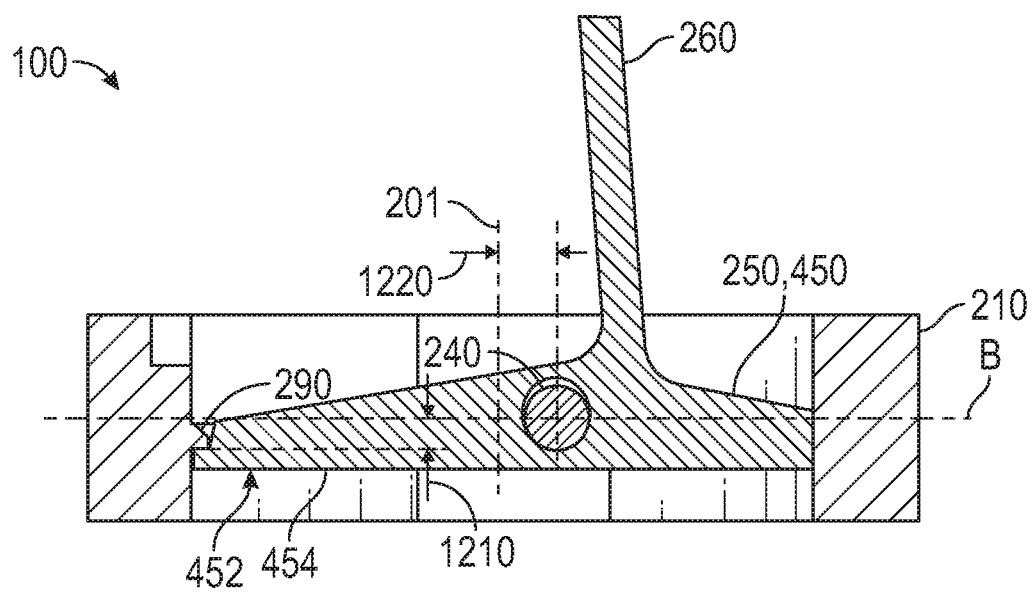
FIG. 12 is a sectional view of the break check valve of FIG. 8 taken along line 10-10 of FIG. 9 and shown in a closed position.

FIGS. 11 and 12 are sectional views of the break check valve 100 of FIG. 8 showing the valve member 250 in partially closed and closed positions, respectively. The first side 453 of the plate 450 of the valve member 250 can define a first side surface 451, which can comprise a contact portion 455 for contacting the stop 290, which can be a ledge, of the valve body 210. With the valve member in the closed position B, the contact portion 455 (shown in FIG. 11) can contact the stop 290 and effectively close the valve 100. Water pressure pushing against the second side surface 452 of the second side 454 can keep the valve 100 in the closed position B. By offsetting the contact portion 455 from a center of the pivot pin 240 in an axial direction and towards an upstream direction (i.e., away from the hydrant 80 and towards the source of the fluid or water in the system 50) with respect to the axis 201 by an offset distance 1210 and by offsetting a center of the pivot pin 240 in a radial direction with respect to the axis 201 by the offset distance 1220, the water pressure pushing against the second side surface 452 of the second side 454 can keep the valve 100 naturally in the closed position B. This can be the case because a greater portion of surface area of the second side surface 452 can be to the left of the pivot pin 240 as shown and therefore the amount of pressure tending to rotate the valve member 250 in a clockwise direction (and therefore tending to keep the valve member 250 in the closed position B) can be greater than the amount of pressure tending to rotate the valve in the counterclockwise direction (and tending to open the valve member 250). In other words, the side of the valve member 250 with less surface area and, more specifically, the fluid pressure against it will resist closure of the valve member 250, but the side of the valve member 250 with greater surface area will have greater pressure behind it, resulting in eventual (if not relatively speedy) closure of the valve member 250.

In any case, the measured closing without slamming of the valve member 250 can allow the momentum of the fluid or water in the system 50 to dissipate, which can result in a lower pressure spike upon closure. The offset distance 1210 can allow the stop 290 shown to extend over the center of balance or a point of stable equilibrium of the valve member 250, which can be through a centroid of the area of the valve member 250 that the fluid pressure is acting on. Also as a result of the offset distance 1210 or the offset distance 1220 or both together, an increased load can be carried by the stop 290 and less by the pivot pin 240. More specifically, the pressure against the larger "closing" side of the plate 450 of the valve member 250 can be partially or fully transferred to the stop 290. The offset distance 1210, the offset distance 1220, a spring constant of the dampener 610, and other variables, where present, can be adjusted or tuned so that the valve member 250 rotates and slows at the desired speed and does or does not rotate beyond the closed position B.

Figure 13:
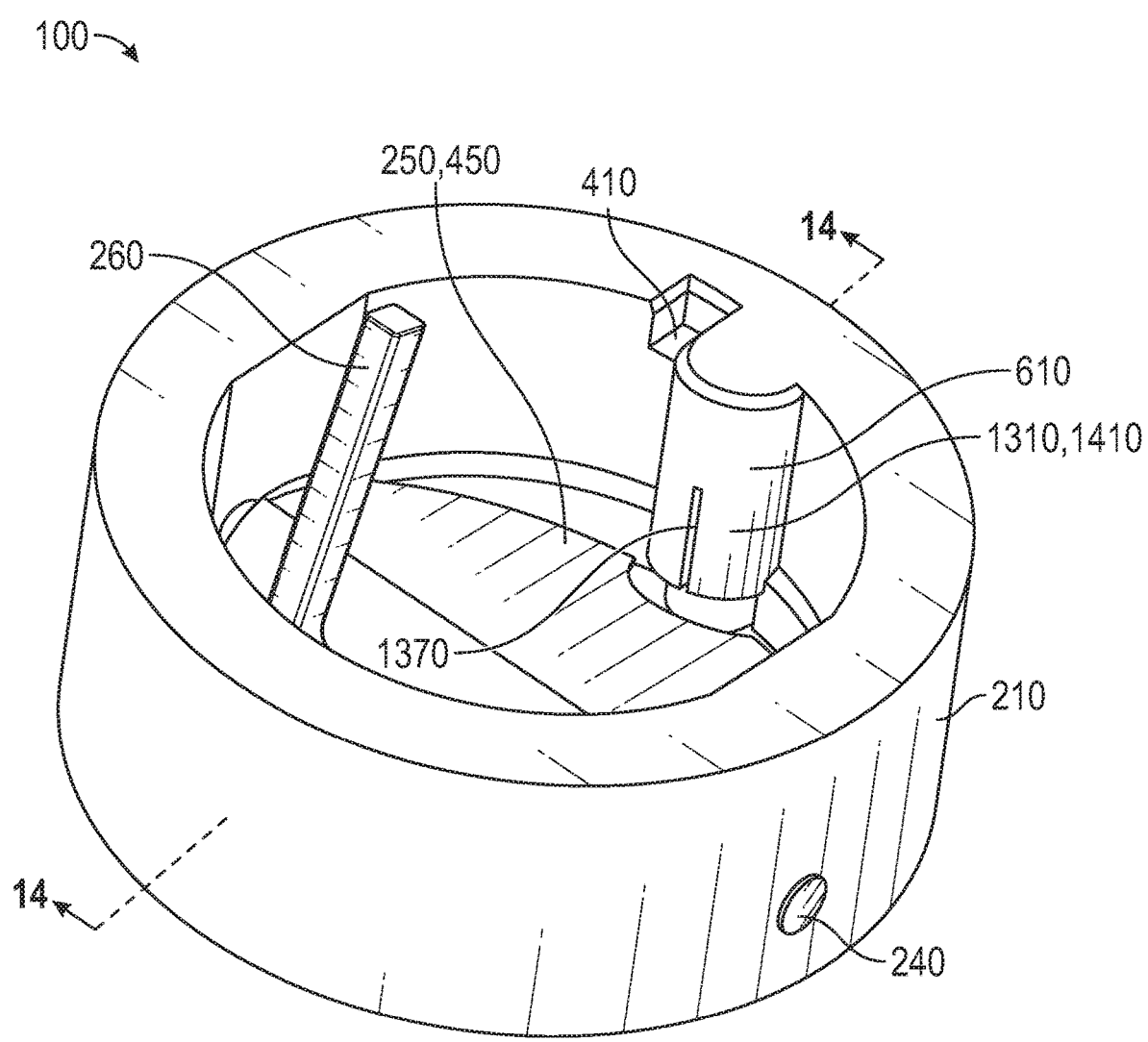
FIG. 13 is a top perspective view of a break check valve in accordance with another aspect of the current disclosure in a closed position.
Figure 14:
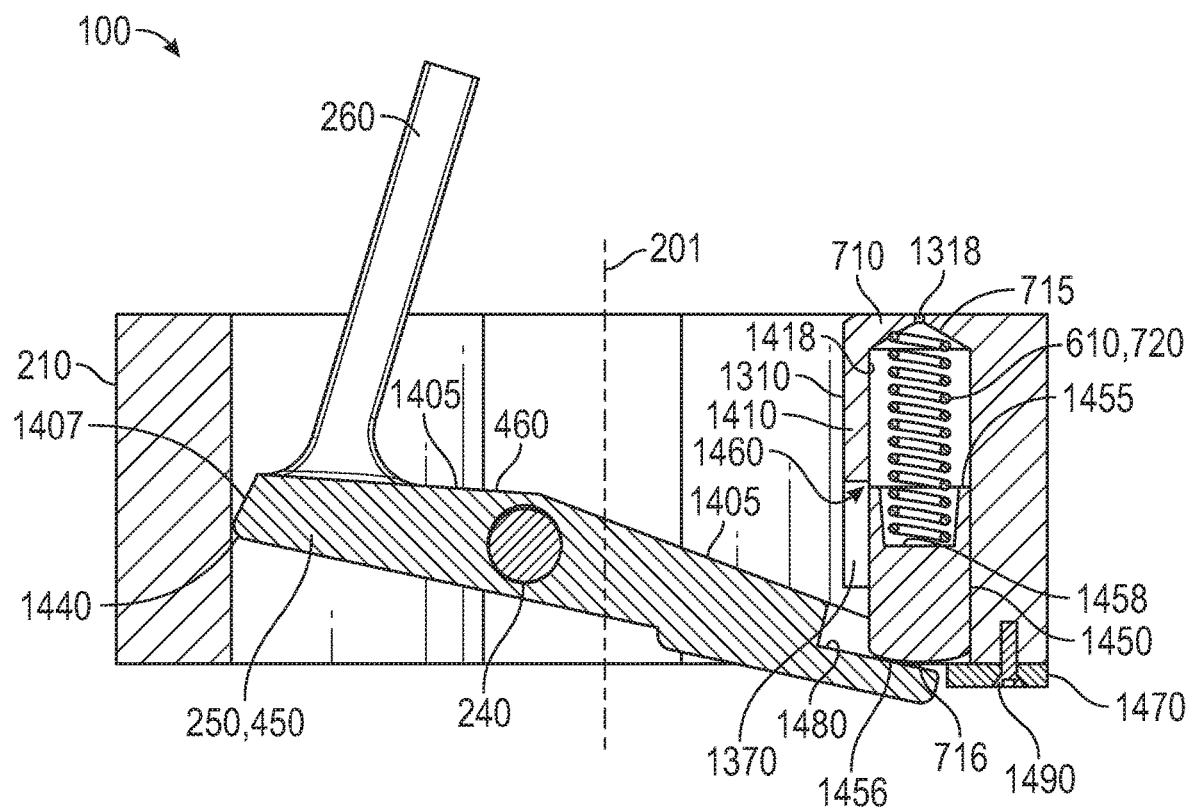
FIG. 14 is a sectional side view of the break check valve of FIG. 13 in a partially closed position.
Figure 15:
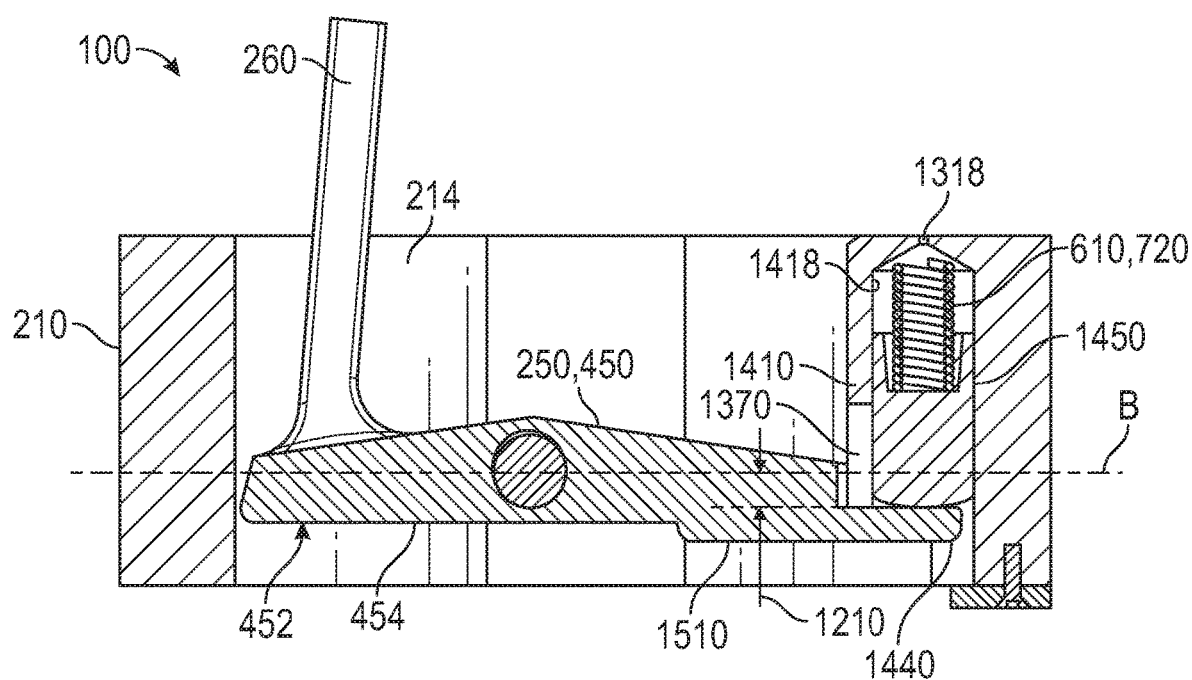
FIG. 15 is a sectional side view of the break check valve of FIG. 13 in a closed position.

FIGS. 13-15 show the break check valve 100 in accordance with another aspect of the current disclosure. FIG. 13 specifically is a top perspective view of the break check valve 100 in the closed position B. Again, the valve 100 can comprise the dampener 610, which can be different than that shown in FIGS. 6 and 7 and can comprise a fluid-filled shock absorber. The valve body 210 can comprise the support pad 710 (shown in FIG. 14), which can again support the biasing member 720 (shown in FIG. 14). The valve body 210, however, can further comprise a housing 1310, which can define a cylinder and which in part also define the support pad 710, for receiving a biasing member such as the biasing member 720, which can again be a coil spring. As shown, the stop notch 410 can be positioned on the same side of the valve body 210 as the dampener 610. As shown, the housing 1310 can define a slit or slot 1370 extending through a housing wall 1410.

FIG. 14 is a sectional side view of the break check valve 100 of FIG. 13 in a partially closed position. The valve member 250 can contact the second end 716 of the dampener 610, and the first end 715 can contact and be supported by the support pad 710 and the housing 1310 of the valve body 210. Moreover, the dampener 610 can extend vertically downward away from the support pad 710. The housing 1310 can also comprise the housing wall 1410, and the dampener 610 can further comprise a piston 1450 defining a first end 1455 and a second end 1456. As shown, the first end 1455 can define a cavity 1458, which can be sized to receive the biasing member 720, and the second end 1456 can be rounded to engage a rotating valve member 250. The housing 1310 can likewise define a cavity 1418, which can be sized to receive the biasing member 720. The slot 1370 can allow fluid through a gap 1460, which can be defined between the piston 1450 and the housing wall 1410 of the housing 1310, into the cavity 1418. As the valve member 250 moves toward the closed position B, the piston 1450 can close or block off the slot 1370 and become a shock absorber due to the controlled exit of the fluid or water in the system 50 through an orifice 1318, which can have a diameter substantially smaller than an inner diameter of the cavity 1418 and the piston 1450 in order to restrict or slow movement of the piston 1450 and therefore also the valve member 250 because the fluid will not be able to pass through the orifice 1318 as quickly as the valve member 250 is trying to close.

The valve member 250 can define a recess or notch 1480 proximate to the second end 1456 of the piston 1450 of the dampener 610 and sized to receive the second end 1456 of the piston 1450. As shown, the valve member 250 can define a taper 1405 from the thickened portion 460 to an outer edge 1440 of the valve member 250. The valve member 250 can also define a taper 1407 and can define a radius at the outer edge 1440 in an axial direction (when the valve member 250 is in the closed position B shown in FIG. 15) to limit or eliminate friction and binding of the valve member 250 within the valve inner cavity 214 of the valve body 210 or to be able to reduce a diameter of the valve bore 217 relative to a diameter of the valve member 250 (or, conversely, to be able to increase the diameter of the valve member 250 relative to the diameter of the valve bore 217) more than would otherwise be possible without such edge treatment.

As shown in FIG. 14, the valve member 250, at least when proximate to the closed position B (shown in FIG. 15), can make initial contact with the piston 1450 of the dampener 610. By not only contacting but also compressing the dampener 610 as shown in FIG. 15, the dampener 610 can slow down the rotation of the valve member 250 and thereby cushion closing of the valve 100 (which, again, can reduce the risk of water hammer and its potential effects). While the biasing member 720 is shown in a maximum compressed condition when the valve member 250 is in the closed position B, a coil length, gage, and other characteristics including the spring constant of the biasing member 720 can be adjusted to allow maximum compression of the dampener 610 when the valve member 250 is in a different position. These adjustments to the dampener 610 can, for example, allow the valve member 250 to rotate beyond the closed position B and then return to the closed position B after energy stored by the dampener 610 during rotation of the valve member 250 beyond the closed position B pushes the valve member 250 back to the closed position B.

In addition, presence of a fluid such as the fluid of the system 50 inside the cavity 1418 and the cavity 1458 can further dampen the movement of the valve member 250 proximate to the closed position B. Many fluids, including water, are nearly or practically incompressible. As such the fluid trapped inside the cavities 1418,1458 can provide a dampening effect when an exit bore or orifice 1318 providing fluid communication between the cavities 1418,1458 and the valve inner cavity 214 allow flow of the fluid out of the cavities 1418,1458 and into the valve inner cavity 214 of the valve body 210. Any gaps such as the gap 1460 present between the housing wall 1410 and the piston 1450 can also allow additional fluid flow into the valve cavity 214 to dampen the movement of the valve member 250. The fluid cannot pass through the orifice 1318 as quickly as the valve member 250 tries to close, and therefore it can slow the closure of the valve member 250. This slowed movement of the valve member 250 can dissipate the flow rate of water through the valve 100, which can lower the overall momentum of the valve member 250 upon closure. The dampening effect of the dampener 610 can therefore be adjusted by adjusting the size of the orifice 1318 and any of the gaps or channels providing fluid communication between the cavities 1418,1458 of the dampener 610 and the valve inner cavity 214 of the valve body 210.

Proximate to and under the piston 1450, a plate or tab 1470 can be secured to the valve body 210 with a fastener 1490 to prevent dislocation of the piston 1450 from the cavity 1418 under normal operation of the valve 100.

FIG. 15 is a sectional side view of the break check valve 100 with the plate 450 of the valve member 250 in the closed position B. As shown, the offset distance 1210 and the offset distance 1220 (shown in FIG. 12) can be present. A step portion 1510 can be defined in the second side 454 and the second side surface 452 and can be offset from a remaining portion of the second side 454 and the second side surface 452 in order to facilitate the offset distance 1210 and at the same time minimize material use in and therefore a weight of the valve member 250. In some aspects such as those involving a fluid in a housing such as the housing 1310 in which the fluid resists but does allow movement of a piston therein (e.g., the piston 1450 and the housing 1310), the dampener 610 can be a hydraulic dampener configured to hydraulically dampen the valve member 250 of the valve 100.

Figure 16:
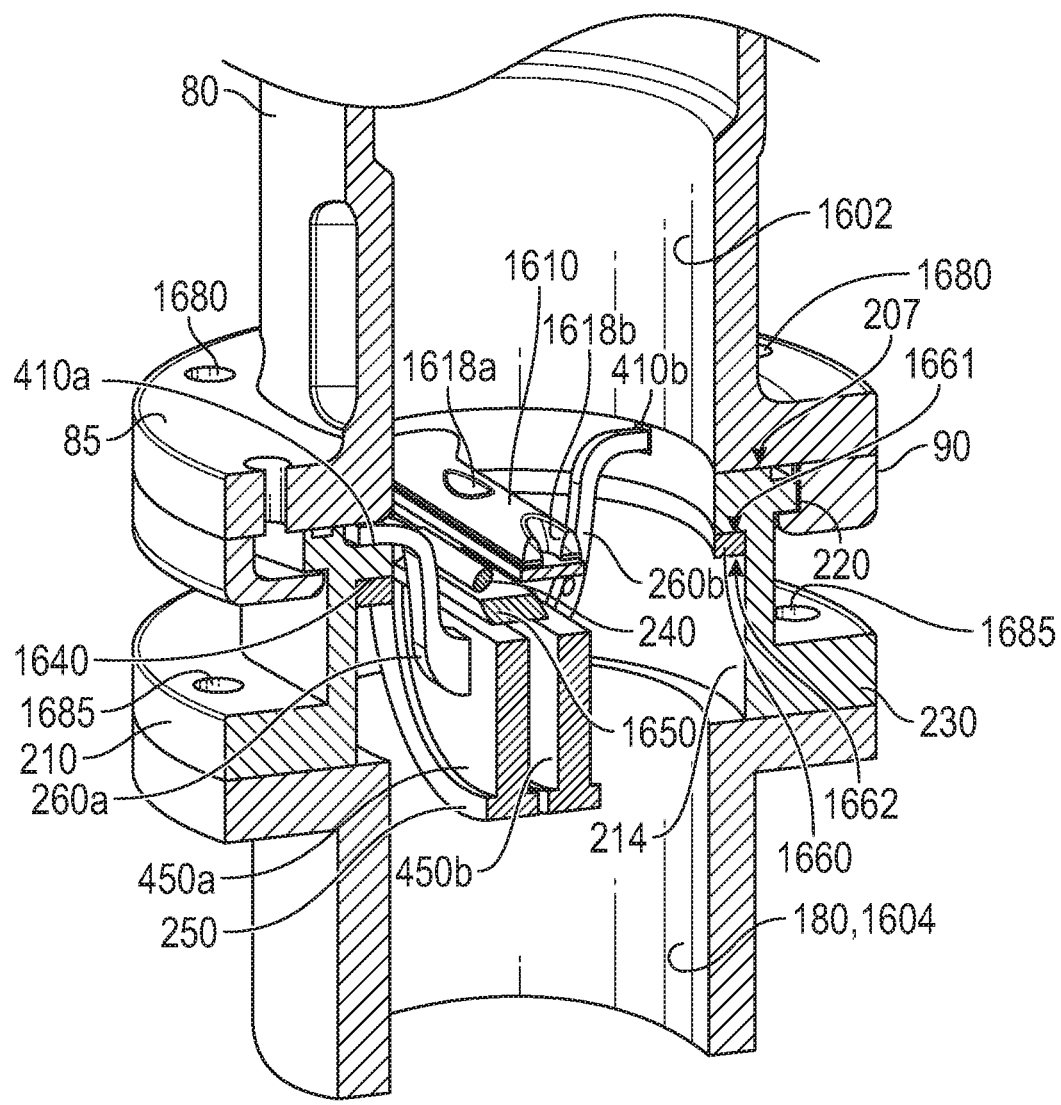
FIG. 16 is a partial sectional perspective view of the hydrant of FIG. 1 assembled to a break check valve in accordance with another aspect of the current disclosure.

FIGS. 16-21 show the break check valve 100 in accordance with yet another aspect of the current disclosure. FIG. 16 specifically is a partial sectional perspective view of the valve 100 assembled to the hydrant 80 and the pipe fitting 180. The valve body 210 can comprise a cross member 1610, which can define a hole 1618 extending from a top surface to a bottom surface of the cross member 1610. As shown, the cross member 1610 can define more than one of the holes 1618 such as holes 1618*a,b*, a bore of each of which can be in fluid communication with each of the hydrant inner cavity 1602 of the hydrant 80 and the inner cavity 1604 of the pipe fitting 180. In some aspects, as shown, the cross member 1610 can be formed monolithically with the valve body 210. In other aspects, the cross member 1610 can be formed separately from the valve body 210.

In some aspects including the double disc configuration shown, the valve member 250 can define multiple plates such as the pair of substantially semicircular plates 450*a,b*.

Arms 260a,b can extend from the respective plates 450a,b and the valve member 250 and the valve 100 can be held in an open position within stop notches 410a,b of the valve body 210 and under the mounting flange 85 of the hydrant 80. As shown, the arms 260a,b can be positioned entirely within the valve body 210 and not extend past the mating surface 207 when the valve 100 is in the open position.

A shim or spacer 1660 can be positioned along the axis 201 (shown in FIG. 18) of the valve 100 between an internal flange 1640 of the valve body 210 and the valve member 250 or simply below the internal flange 1640. The spacer 1660 can define a first or upper surface 1661 and a second or lower surface 1662. The spacer 1660 can define a thickness 1663 (shown in FIG. 18), an outer diameter, and an inner diameter. The spacer 1660 can define openings 1664a,b (both shown in FIG. 18), which can extend from the upper surface 1661 to the lower surface 1662 and can define the inner diameter of the spacer 1660. As shown in FIG. 16, the inner diameter of the spacer 1660 can match an inner diameter of the valve body 210 proximate to the internal flange 1640. Also as shown, the outer diameter of the spacer 1660 can match an inner diameter of the valve body 210 adjacent to the internal flange 1640. The spacer 1660 can itself define a cross member 1650.

The spacer 1660 can comprise a soft, elastic material that when contacted by the plates 450a,b of the closing valve member 250 will compress and thereby dampen any pressure spike in the system 50 upon closure of the valve 100. The spacer 1660 can comprise any elastomer or elastomeric material such as, for example and without limitation, Buna-N rubber (i.e., nitrile rubber or acrylonitrile butadiene rubber), ethylene propylene diene (EPDM) rubber, natural rubber, or silicone. In various aspects, a material hardness of the spacer 1660 can measure less than 60 on the Shore A scale. In various aspects, a material hardness of the spacer 1660 can measure within a range between 10 on the Shore A scale and 20 on the Shore A scale. In various aspects, a material hardness of the spacer 1660 can measure 10 on the Shore A scale or 20 on the Shore A scale. In some aspects, the spacer 1660 can define an overall thickness that is less than a thickness of the plates 450a,b. In various aspects, the spacer 1660 can be the dampener 610. In various aspects, the spacer 1660 can be used in combination with the dampener 610 or a band 2210 (shown in FIG. 22) disclosed elsewhere herein.

Figure 17:
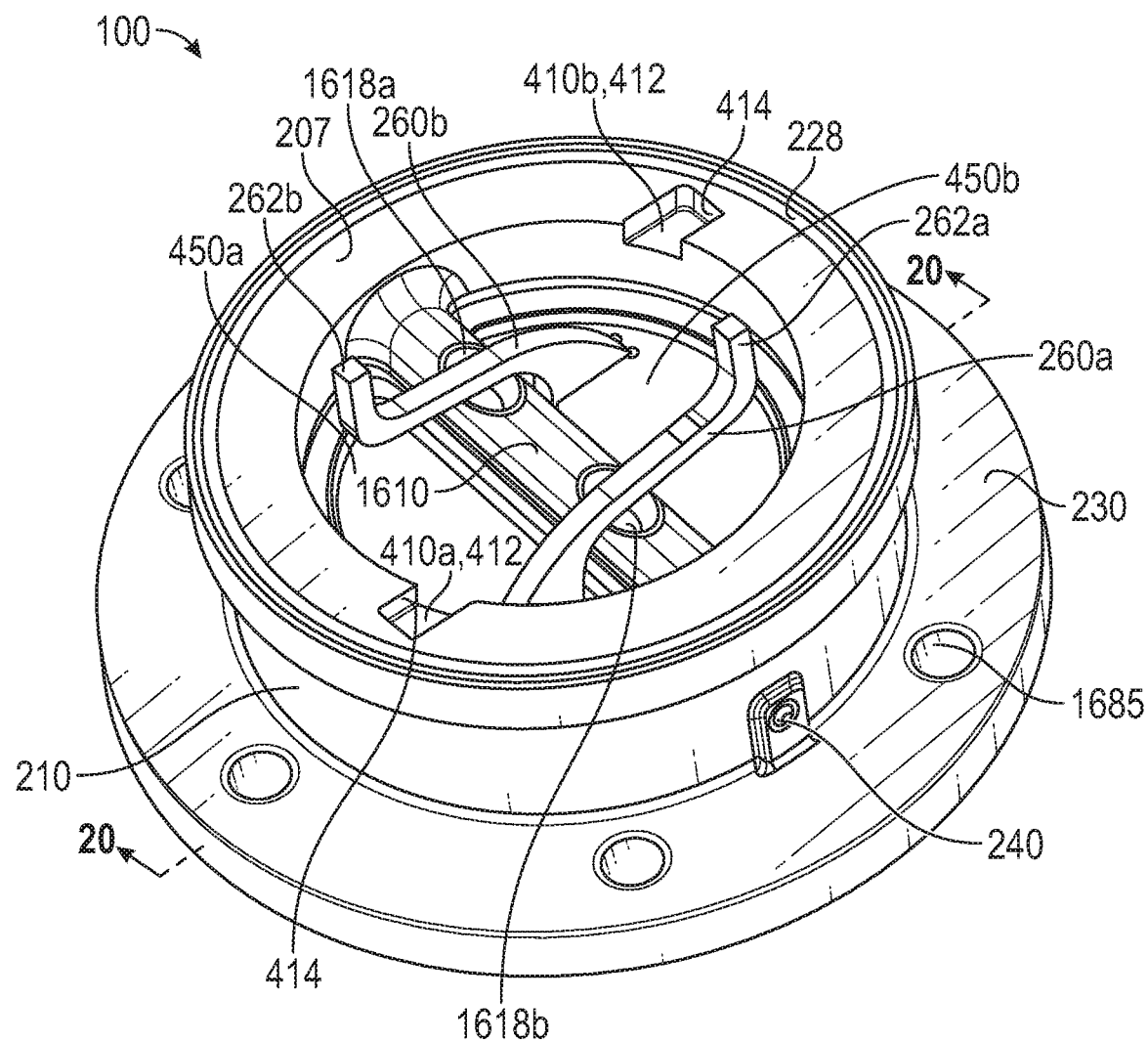
FIG. 17 is a top perspective view of the break check valve of FIG. 16 in a closed position.

FIG. 17 is a top perspective view of the plates 450a,b of the valve member 250 of the break check valve 100 in the closed position B (shown but not marked in FIG. 17). The respective arms 260a,b of each of the plates 450a,b can be shaped to clear (i.e., not physically interfere with) the cross member 1610 whether the valve members 250—and the valve 100 overall—are in the open position A (shown but not marked in FIG. 16) or the closed position B or somewhere in between. As shown, each of the stop notches 410a,b can define the bottom 412 and the side wall 414 and can be sized to receive the respective tip 262a,b of the respective arm 260a,b. The height 415 (shown in FIG. 4) of the side wall 414 of each stop notch 410a,b and the distance 417 (shown in FIG. 4) from the bottom 412 of each stop notch 410a,b to the mating surface 207 of the valve body 210 can be at least the thickness 510 (shown in FIG. 20) of the tip 262a,b of the arm 260a,b. In some aspects, as shown (and also shown in FIG. 21 with respect to the arm 260a), a lateral position of the arms 260a,b can be aligned with a lateral position of the holes 1618a,b defined in the cross member 1610. When the valve 100 actuates and the valve member 250 closes, the fluid shooting or passing through the holes 1618a,b and at the arms 260a,b can push on the arms 260a,b and particularly the tip 262a,b of the arms 260a,b to resist closure of the valve member 250. This effect can be increased as the valve 100 closes and a speed of the fluid flow through the holes 1618a,b increases such that as the valve 100 closes it decelerates.

Figure 18:
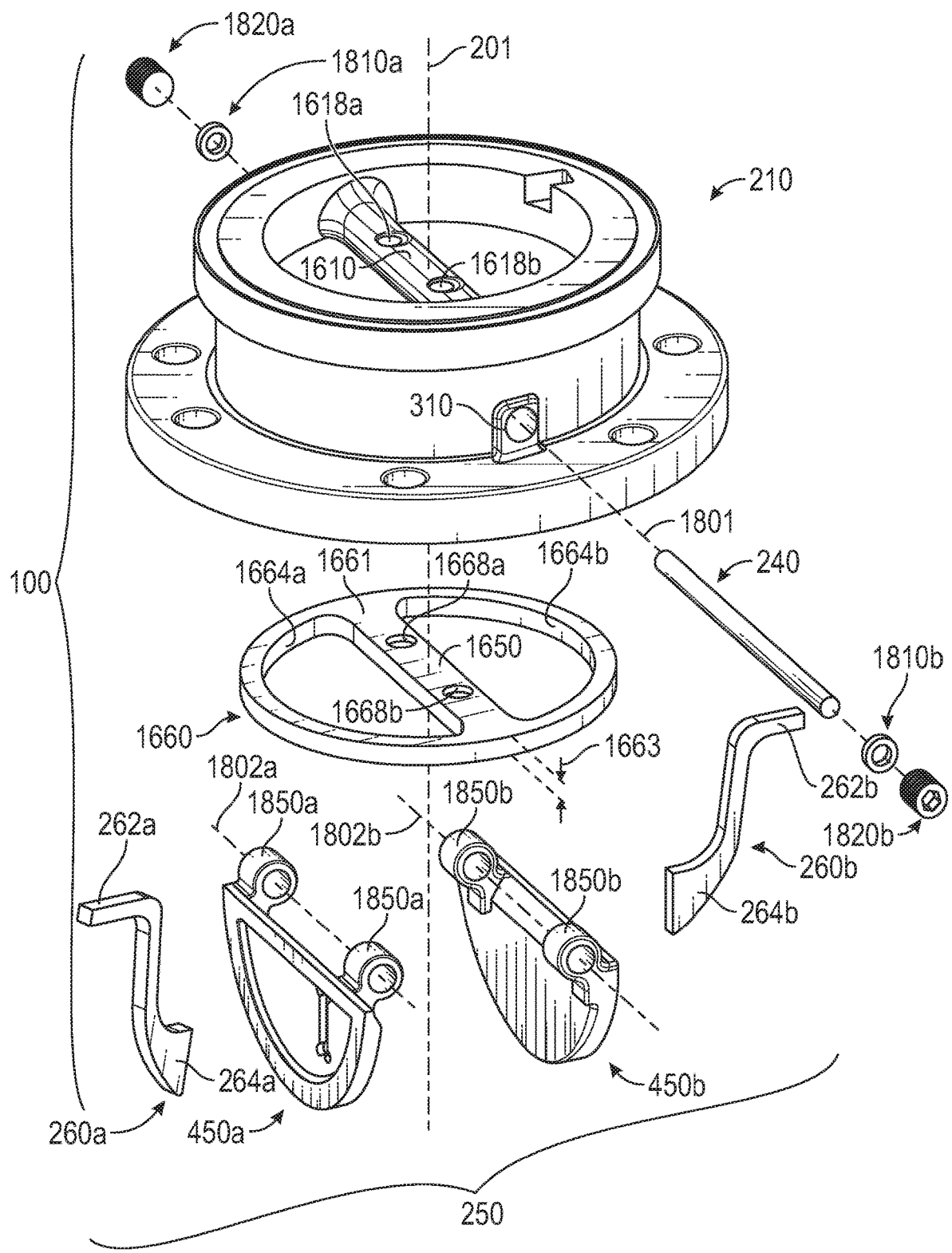
FIG. 18 is an exploded top perspective view of the break check valve of FIG. 16 in an open position.

FIG. 18 is an exploded top perspective view of the break check valve 100 with the plates 450a,b of the valve member 250 oriented in an open position. The pivot pin 240 can be received within the pivot bore 310, which can define a pivot axis 1801. Washers 1810a,b can be slid over the pivot pin 240 and as described below can be positioned in one or more locations to facilitate opening and closing of the valve 100. Fasteners 1820a,b can be positioned beyond ends of the pivot pin 240 and can cover the ends of the pivot pin 240 to help fix or control the axial position of the pivot pin 240 and to prevent leakage of fluid or contaminants into or out of the valve 100 and thereby also the system 50.

Each of the washers 1810a,b can define a bore which can be sized to receive the pivot pin 240. In some aspects, the pivot pin 240 can rotate with respect to the washers 1810a,b. In other aspects, the pivot pin 240 can rotate together with the washers 1810a,b inside the pivot bore 310. In some aspects, the washers 1810a,b can be positioned proximate to each end of the pivot pin 240 and proximate to the valve bore 217 and the valve inner cavity 214. In other aspects, the washers 1810a,b can be positioned proximate to each end of the pivot pin 240 proximate to the outer surface 211 of the valve body or somewhere between the outer surface 211 and the inner surface 212.

Each of the fasteners 1820a,b can be received within the pivot bore 310 to seal the pivot bore 310 as described above, although in some aspects the pivot bore 310 need not be sealed. In some aspects, the fasteners 1820a,b can each define threads configured to be received within a threaded portion of the pivot bore 310. In other aspects, the fasteners 1820 can be secured inside the pivot bore 310 without threads and instead with, for example and without limitation, an interference fit, with an adhesive, or with another fastener. As shown, each of the fasteners 1820a,b can be a set screw with a hex recess on a first end and a flat surface on a second end. In some aspects, the pivot pin 240 can contact the fasteners 1820a,b during operation of the valve 100. In other aspects, the pivot pin 240 and the fasteners 1820a,b can define a gap therebetween at either or both ends of the pivot pin 240.

Each of the pivot pin 240, the washers 1810a,b, and the fasteners 1820a,b can be aligned and assembled along the pivot axis 1801, as can the plates 450a,b of the valve member 250. The plates 450a,b can nest together and can define plate bore axes 1802a,b, which can align along or with the pivot axis 1801 of the valve body 210. Each of the plates 450a,b can define a lug or a plurality of lugs 1850a,b, each of which can define the pivot bore 458 (shown in FIG. 19) defining the axes 1802a,b. In some aspects, the pivot bore 458 of each of the lugs 1850 can be smooth and each of the plates 450a,b can be configured to rotate with respect to the pivot pin 240.

The arms 260a,b can be formed separately from and be fastened to the plates 450a,b. In some aspects, the arms 260a,b can be fastened to the plates 450a,b by welding or with weldments at a joint or seam between the arms 260a,b and the plates 450a,b. In other aspects, the arms 260a,b can be fastened to the plates 450a,b using another type of fastener such as, for example and without limitation, a screw or a pin or can slide or snap into position inside the plates 450 without the use of any fasteners.

The spacer 1660 can define a hole 1668 or, as shown, a pair of holes 1668a,b, each of which can be in fluid communication with each of the hydrant inner cavity 1602 of the hydrant 80 and the inner cavity 1604 of a neighboring portion of the system 50 such as, for example and without limitation, the pipe fitting 180. The holes 1618a,b of the valve body 210 can be aligned with the holes 1668a,b, respectively, so that together 1618a and 1668a and, likewise, 1618b and 1668b can be in fluid communication with each of the hydrant inner cavity 1602 and the inner cavity 1604. In various aspects, the valve 100 can define a hole such as the holes 1618a,b separate from the valve bore 217 and in fluid communication with a portion of the valve inner cavity 214 on either side of the valve member 250 when the valve member 250 is in the closed position B (shown in FIG. 24).

Figure 19:
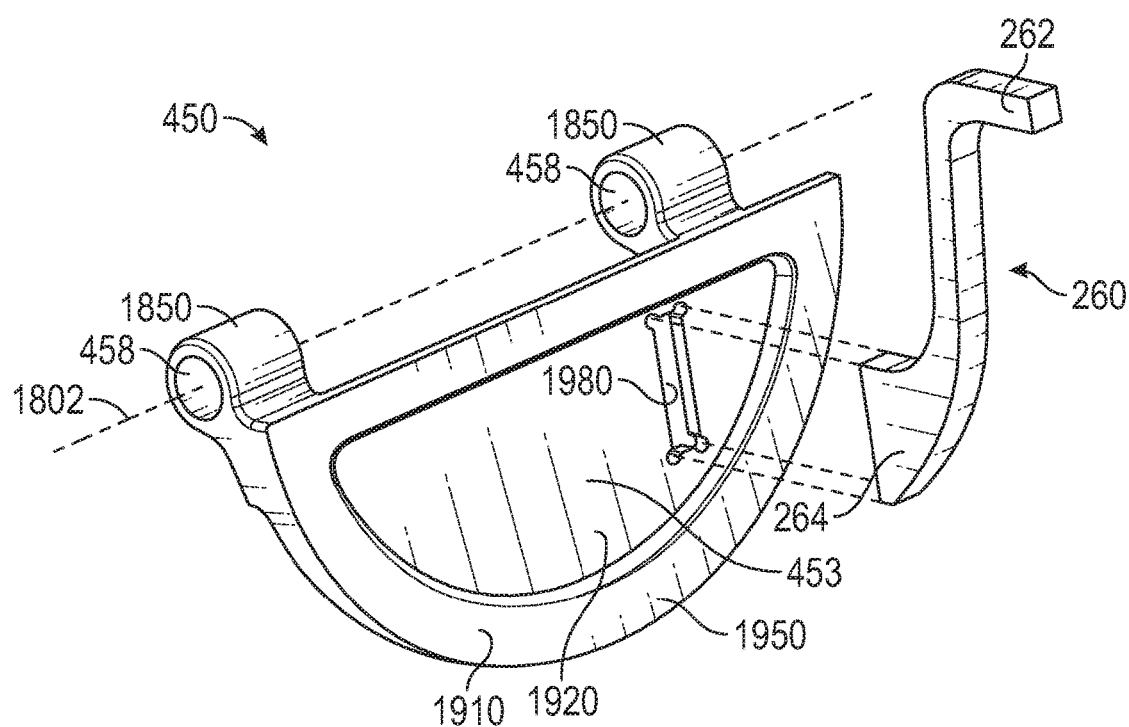
FIG. 19 is an exploded top perspective view of a valve member of the break check valve of FIG. 16.

FIG. 19 is an exploded top perspective view of a portion of the valve member 250 of the break check valve 100. Specifically, the plate 450 can define a recess 1980 sized to receive the base 264 of the arm 260. In some aspects, to clear neighboring parts such as the cross member 1610 (shown in FIG. 16) during operation of the valve 100, the arm can define an "S" shape when viewed from a side. The arm 260 can be mounted in an orientation or in a plane that is orthogonal to the axis of rotation of the plate 450, i.e., an axis 1802. Each of the lugs 1850 and the axis 1802 can be offset from the first side 453 and specifically a sealing portion 1950 of the first side surface 451, and as described with respect to previous figures each of the plates 450a,b can be biased towards the closed position B. In some aspects, an outer rim 1910 can define the sealing portion 1950 and can define a greater thickness than a thickness of a web 1920 of the plate 450a,b. The sealing portion 1950 can be flat or substantially flat to adequately seal against a mating surface of the valve 100 such as, for example and without limitation, the spacer 1660 (shown in FIG. 18), which can also be flat as shown.

In some aspects a portion of the valve member 250 or, more specifically, the plate 450 can define a hole (not shown), which is similar to the holes 1618a,b of the cross member 1610 or the holes 1668a,b of the spacer 1660. The hole can be in fluid communication with each of the hydrant inner cavity 1602 and the inner cavity 1604 or can be in fluid communication with a portion of the valve inner cavity 214 on either side of the valve member 250 when the valve member 250 is in the closed position B.

Figure 20:
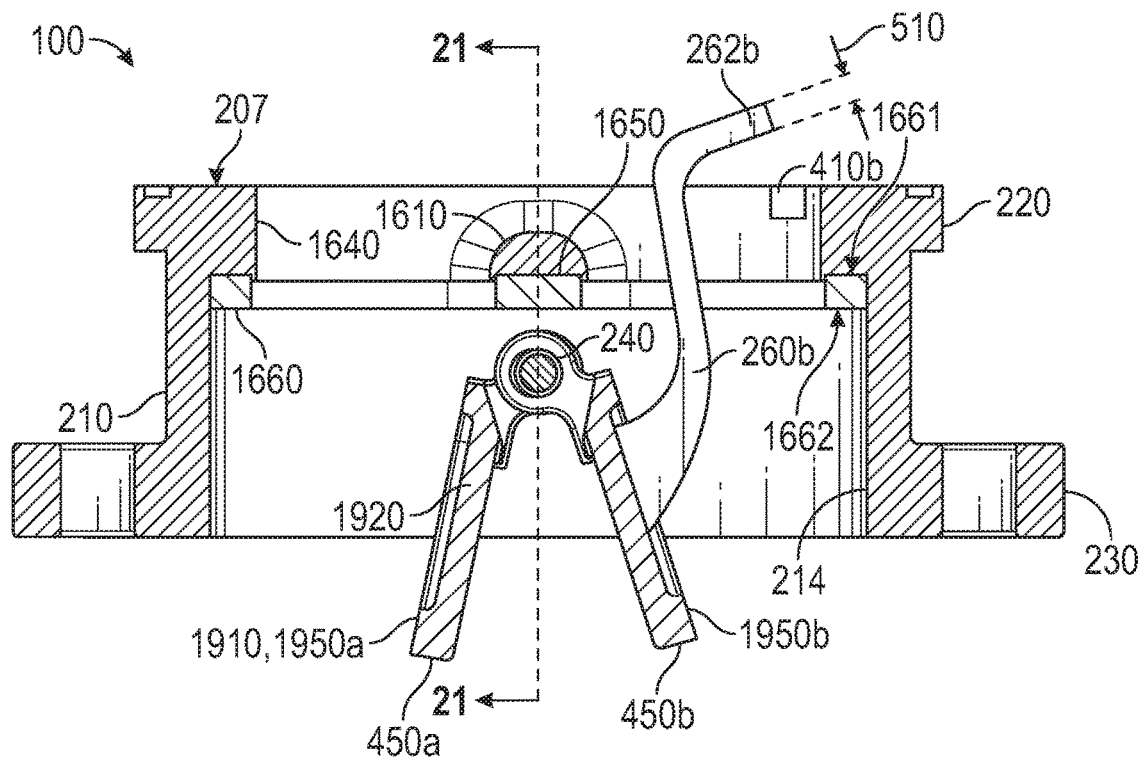
FIG. 20 is a sectional side view of the break check valve of FIG. 16 in a partially closed position taken along line 20-20 of FIG. 17.

FIG. 20 is a sectional side view of the break check valve 100 in a partially closed position. The arm 260b—joined to the plate 450b—is shown raised up and out of the stop notch 410b such as when no hydrant 80 is in contact with the mating surface 207 of the valve body 210. As the valve 100 moves towards the closed position, a sealing portion 1950b of the plate 450b can approach and eventually seal against the lower surface 1662 of the spacer 1660 while the arm 260b (arm 260a shown in FIG. 18) simultaneously wraps around the cross member 1610 of the valve body 210 and the cross member 1650 of the spacer 1660. Simultaneously, a sealing portion 1950a of the plate 450a can approach and eventually seal against the lower surface 1662 of the spacer 1660 on an opposite side of the valve 100 while the arm 260a (shown in FIG. 17) also wraps around the cross member 1610 of the valve body 210 and the cross member 1650 of the spacer 1660.

Figure 21:
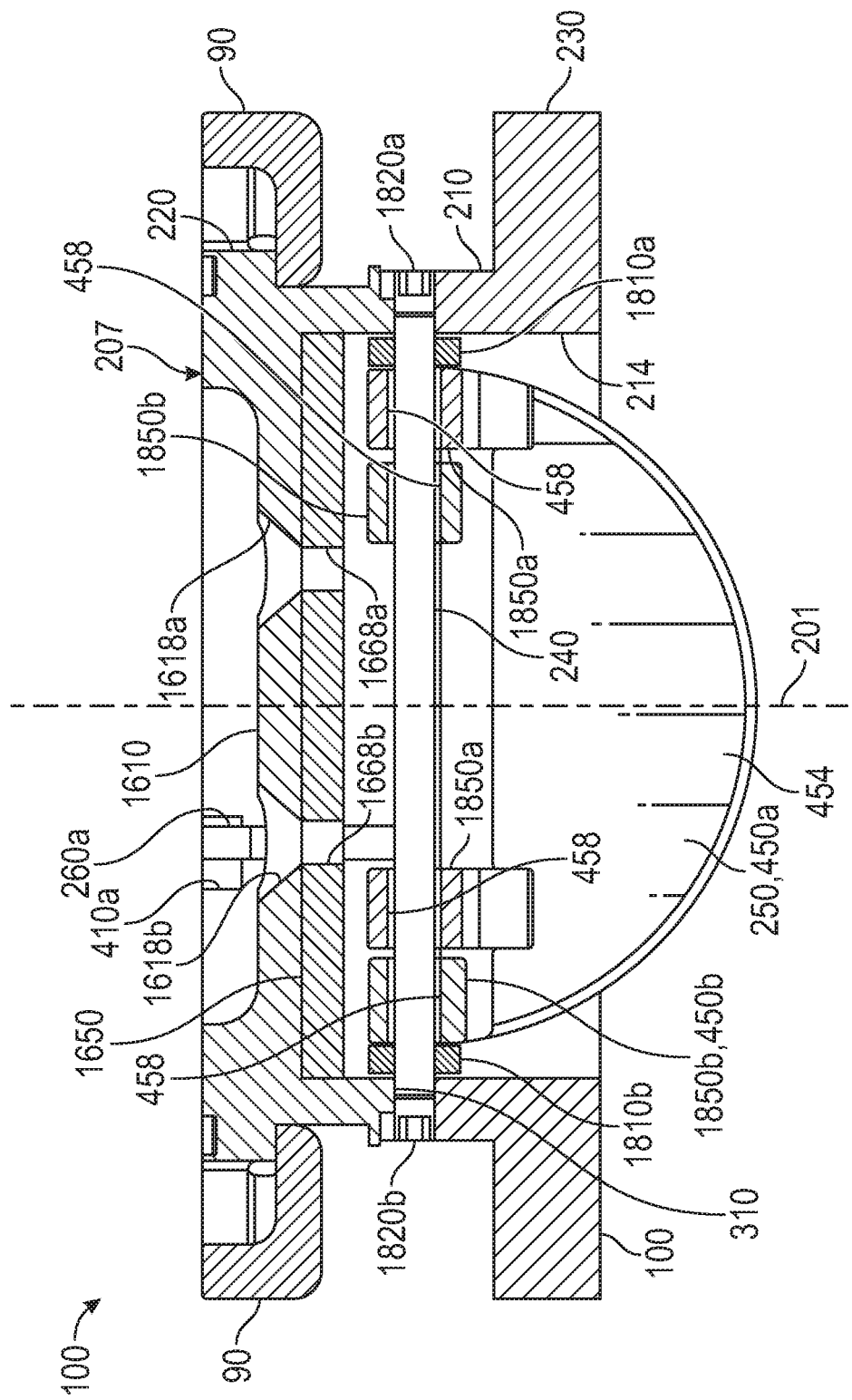
FIG. 21 is a sectional front view of the break check valve of FIG. 16 in a partially closed position taken along line 21-21 of FIG. 20.

FIG. 21 is a sectional front view of the break check valve 100 in a partially closed position. The alignment of the holes 1618a,b of the cross member 1610 with the holes 1668a,b of the cross member 1610 can be seen, as can the position of the washers 1810a,b, the fasteners 1820a,b, and the lugs 1850a,b of the plates 450a,b about the pivot pin 240. As shown, the washer 1810a can be positioned between the valve body 210 and the plate 450a of the valve member 250 with a sufficient gap between the parts to permit rotation of the plate 450a. Similarly, the washer 1810b can be positioned between the valve body 210 and the plate 450b of the valve member 250 on an opposite side of the valve 100 with a sufficient gap between the respective parts to permit rotation of the plate 450b. The pivot pin 240 can extend partly into the pivot bore 310 at each end. In some aspects, each of the washers 1810a,b can be formed from an anti-friction or anti-corrosion material such as, for example and without limitation, acetal, nylon, or another polymer. In other aspects, each of the washers 1810a,b can be formed from any desirable material including a metal or a composite material.

In some aspects, the internal flange 1640 (shown in FIG. 16) can either not be present or can be cut away where the arms 260a,b such that instead of the stop notches 410a,b there is no part of the valve body 210 directly supporting or even contacting the tips 262a,b of the respective arms 260a,b. In such aspects, as shown in the construction of the valve 100 shown in FIG. 37, the arms 260a,b can be held in the open position or horizontal position H (shown in FIG. 4) only on an upper side facing the hydrant 80 by the hydrant 80.

Figure 22:
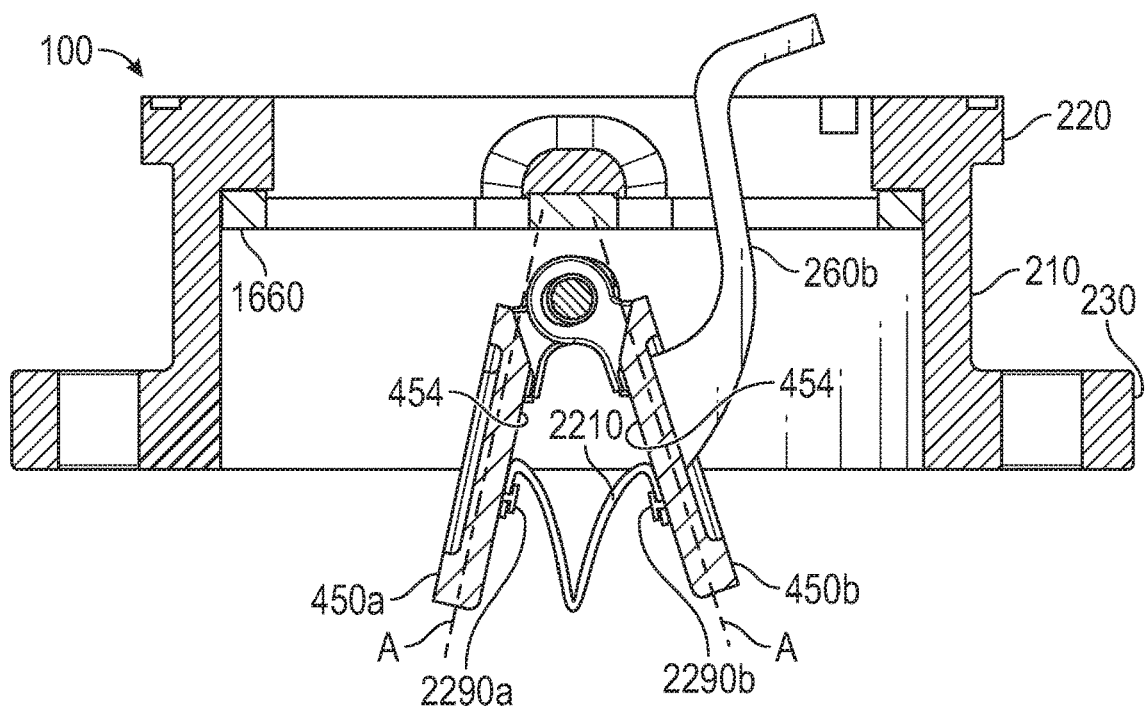
FIG. 22 is a sectional front view of a break check valve of FIG. 16 in an open position in accordance with another aspect of the current disclosure.
Figure 23:
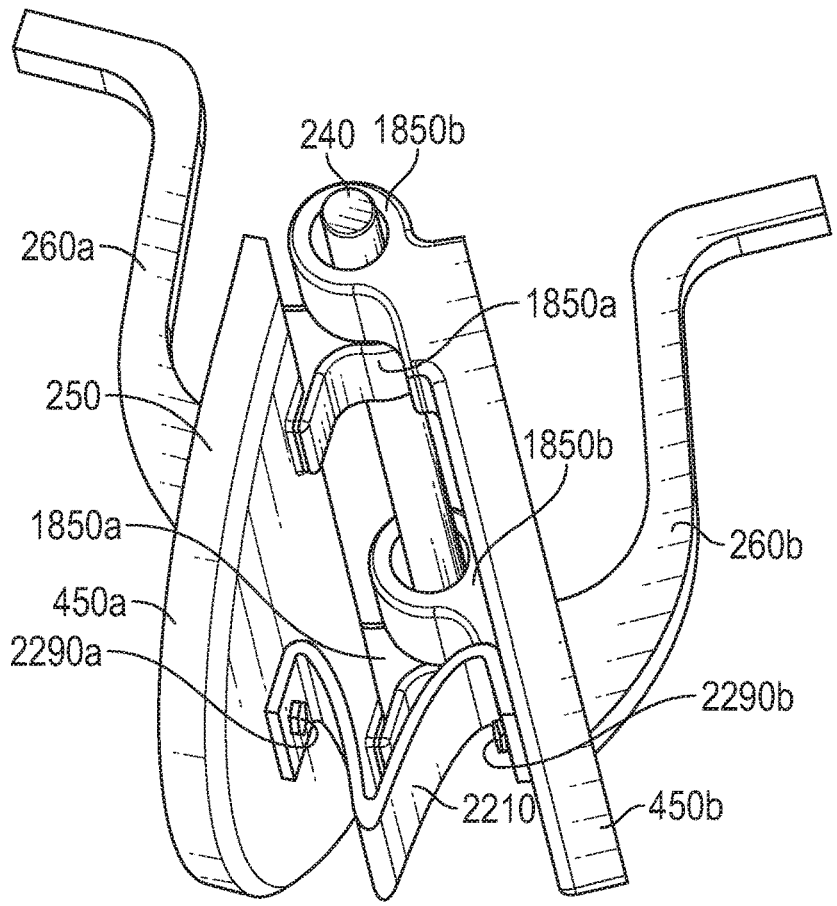
FIG. 23 is a bottom perspective view of a break check valve subassembly of the break check valve of FIG. 22.
Figure 24:
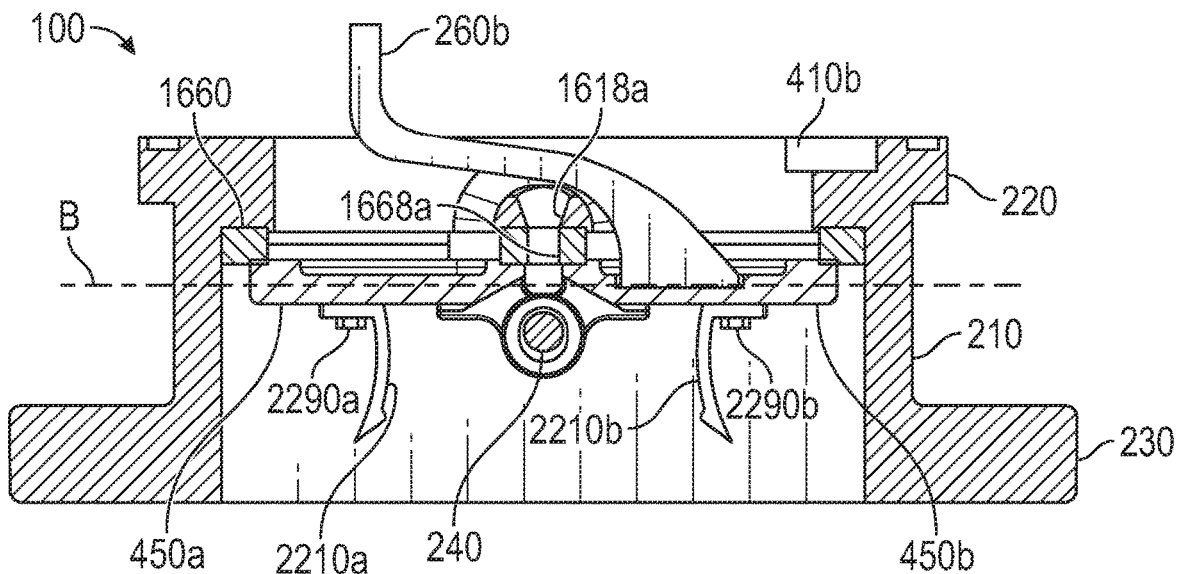
FIG. 24 is a sectional side view of the break check valve of FIG. 22 in a closed position.

FIGS. 22-24 show the break check valve 100 in accordance with another aspect of the current disclosure. FIG. 22 specifically is a sectional front view of the break check valve 100 with the plates 450a,b in the open position A. The aforementioned band 2210 can join the plates 450a,b with respective fasteners 2290a,b. As shown, when the valve member 250 and the valve 100 is in the open position A the band 2210 can be loose and not tightly joining the plates 450a,b. More specifically, the band 2210 can be loose enough for the plates 450a,b to move towards the closed position when the hydrant 80 is dislocated from the valve 100. Also as shown, the second side 454 of each of the plates 450a,b can be at least partially facing the direction of flow of fluid through the valve 100 such that, as described in aspects above in which the valve member comprises a single plate 450, actuation of the valve 100 by dislocation of the hydrant 80 will naturally rotate the plates 450a,b towards the closed position from a position that biases the plates 450a,b slightly towards the closed position instead of, for example, being aligned with a vertical direction.

FIG. 23 is a bottom perspective view of a subassembly of the break check valve 100 comprising the valve member 250, the pivot pin 240, and the band 2210. In some aspects, the fasteners 2290a,b can be a hex fastener such as, for example and without limitation, a screw or a bolt. In other aspects, another fastener can be used (including adhesive or welding) or the band can join the plates 450a,b without separate fasteners. In some aspects, as shown, the plates 450a,b are joined by the band 2210. In other aspects, the band 2210 can join each of the plates 450a,b to a portion of the valve body 210, to the pivot pin 240, or to another portion of the system 50.

FIG. 24 is a sectional side view of the break check valve 100 in the closed position B. The band 2210 can be tight enough for the band 2210 to stretch and even break into band halves 2210a,b as shown when the plates 450a,b completely close and seal against the valve body 210 and, more specifically, the spacer 1660 in some aspects. By being tight enough to stretch, the band 2210 can slow the closing of the plates 450a,b to reduce the risk of water hammer occurring in the system 50 upon the closing of the valve 100. Again, water hammer can result from overly rapid deceleration of fluid within the system 50 such as may occur when a valve such as the valve 100 closes.

In some aspects, the band 2210 can comprise any elastomer or elastomeric material such as, for example and without limitation, Buna-N rubber (i.e., nitrile rubber or acrylonitrile butadiene rubber), ethylene propylene diene (EPDM) rubber, natural rubber, or silicone. In other aspects, the band 2210 can comprise any polymeric or other material, including deformable materials, or even deformable metal materials, which can initially slow the closing of the valve 100 but upon breaking or stretching can permit closing of the valve 100. In some aspects, the band 2210 can be configured to only stretch and can permit closure of the valve 100 without breaking. In other aspects, the band 2210 can be configured to break before or upon closure of the valve 100.

In some aspects, the spacer 1660 can comprise any polymeric or other material, including but not limited to deformable materials, which can be positioned between the valve member 250 and the valve body 210 to cushion more than would the valve body 210 itself cushion the valve member 250 by having a hardness less than that of the valve body 210.

Figure 25:
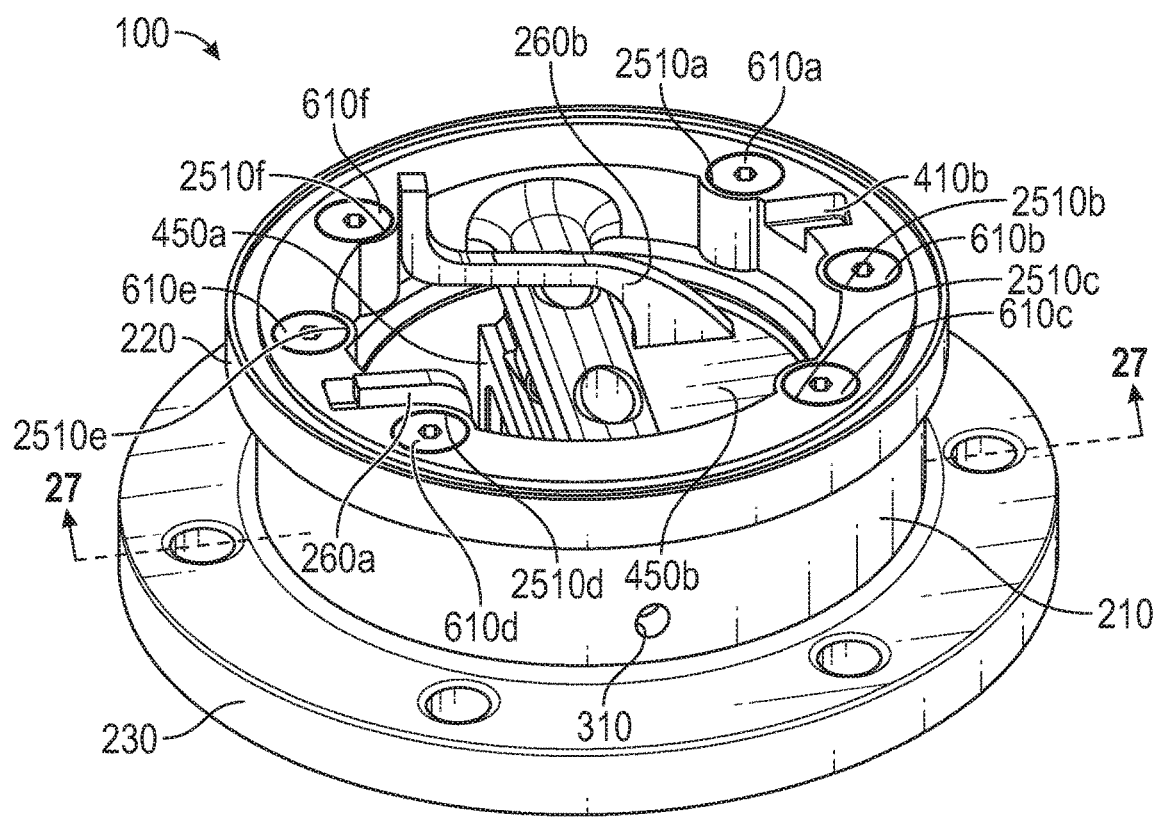
FIG. 25 is a top perspective view of a break check valve in accordance with another aspect of the current disclosure.
Figure 26:
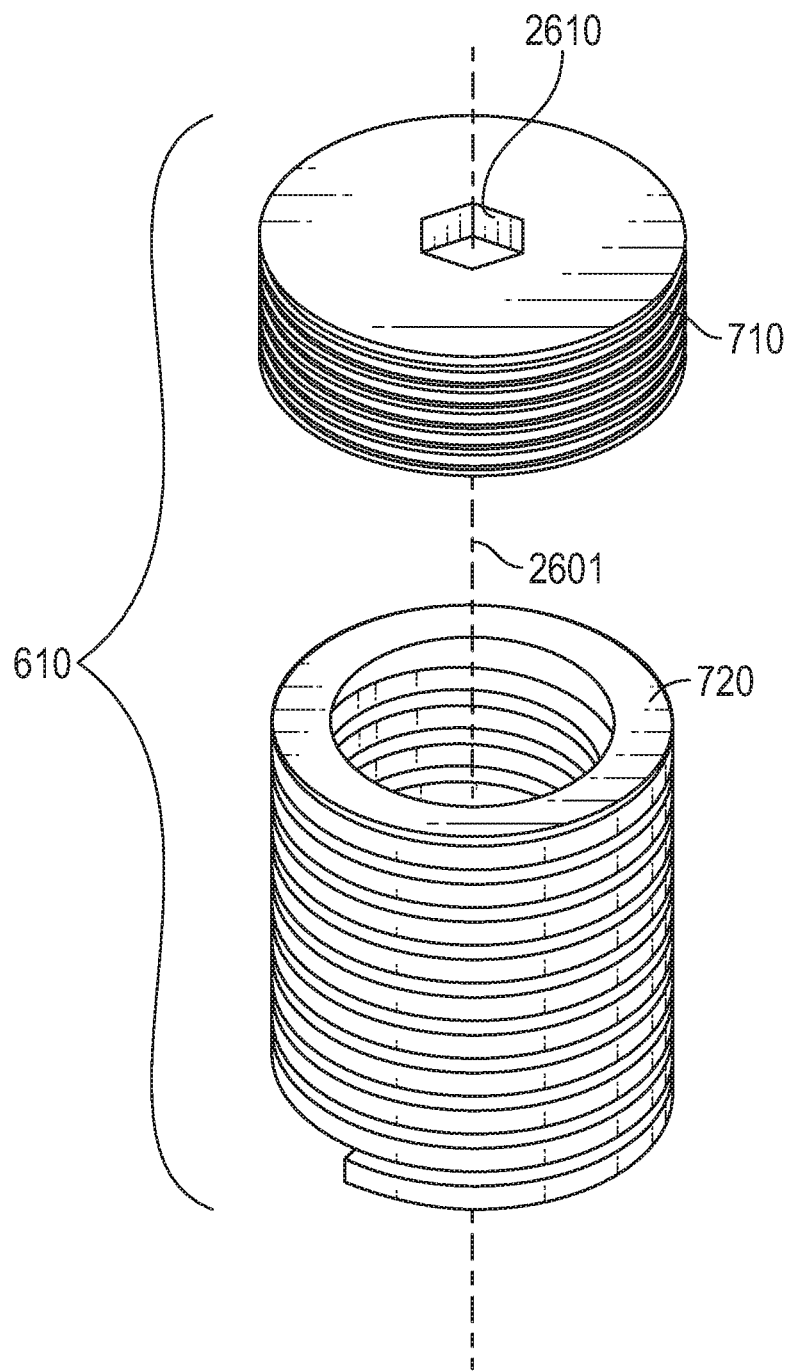
FIG. 26 is an exploded top perspective view of a dampener of the break check valve of FIG. 25.
Figure 27:
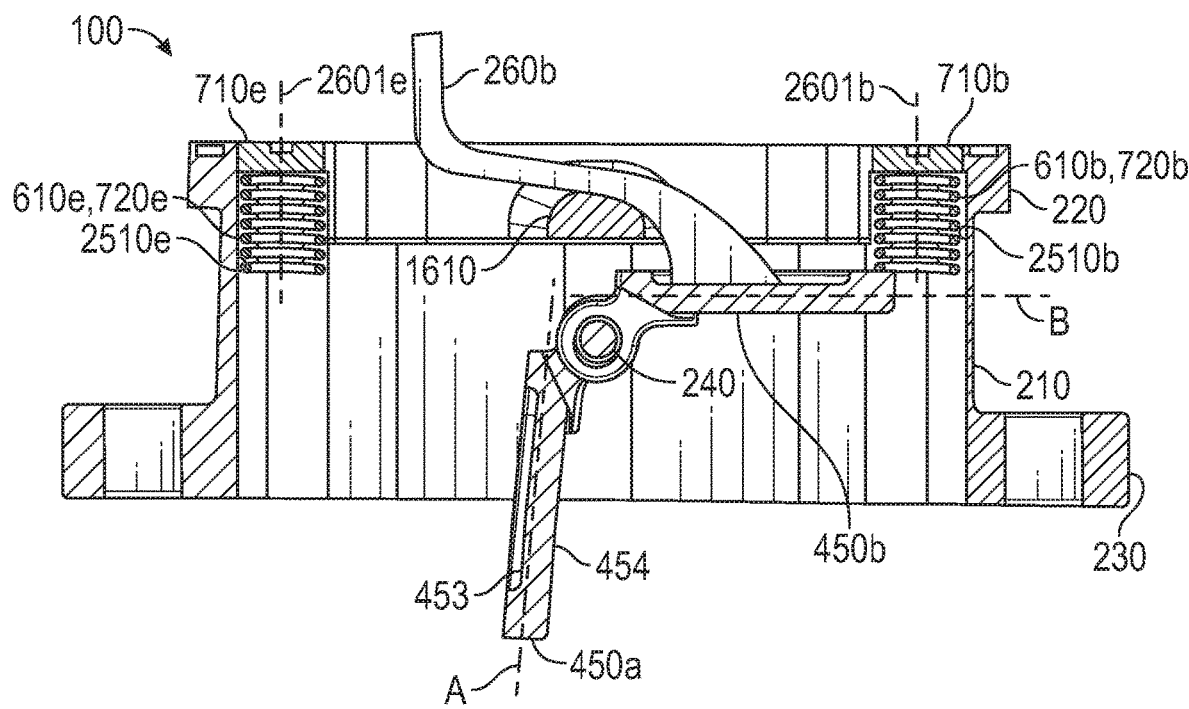
FIG. 27 is a sectional side view of the break check valve of FIG. 25 taken along line 27-27 of FIG. 25.

FIGS. 25-27 show the break check valve 100 in accordance with another aspect of the current disclosure. FIG. 25 specifically is a top perspective view of the break check valve 100 with a one half of the valve member 250 comprising the plate 450a shown in the open position and another half the valve member 250 comprising the plate 450b shown in the closed position. The valve 100 can comprise a plurality of dampeners 610a,b,c,d,e,f positioned in holes 2510a,b,c,d,e,f.

FIG. 26 is an exploded top perspective view of one of the dampeners 610 of the break check valve 100 of FIG. 25. The dampener 610 can comprise the biasing member 720, which can be a coil spring as shown. The dampener 610 can also comprise the support pad 710, which as shown can be formed separately from and assembled to the valve body 210 (shown in FIG. 25). The support pad 710 can define a recess 2610 such as, for example and without limitation, a hex recess. Using a tool (not shown), the recess 2610 can be used to rotate and secure the support pad 710 in a matching hole 2510 in the valve body 210. Each of the support pad 710 and the corresponding matching hole 2510 can define a threaded portion by which each of the support pad 710 and the corresponding matching hole 2510 can engage each other. In some aspects, the support pad 710 can be adjusted in an axial direction with respect to an axis 2601 defined by the support pad 710 and the biasing member 720 to move a bottom end of the biasing member 720 away from or towards the respective plate 450a,b.

FIG. 27 is a sectional side view of the break check valve 100 showing two of the dampeners 610 in cross-section. While not shown, a fastener can be used to hold biasing members such as the biasing members 720b,e inside the holes 2510b,e to the respective support pads 710b,e. While slight interference may be appear to be present between the arm 260b and the cross member 1610, as discussed above the arm 260b can be shaped to clear the cross member 1610. When approaching the closed position B, the plate 450b can not only contact the dampener 610 as shown but can continue rotating past the closed position B, dampening the closure of the valve 100 in the process, which as noted above can reduce the risk of water hammer occurring in the system 50 upon the closing of the valve 100. The plate 450b can then return to the closed position B.

Figure 28:
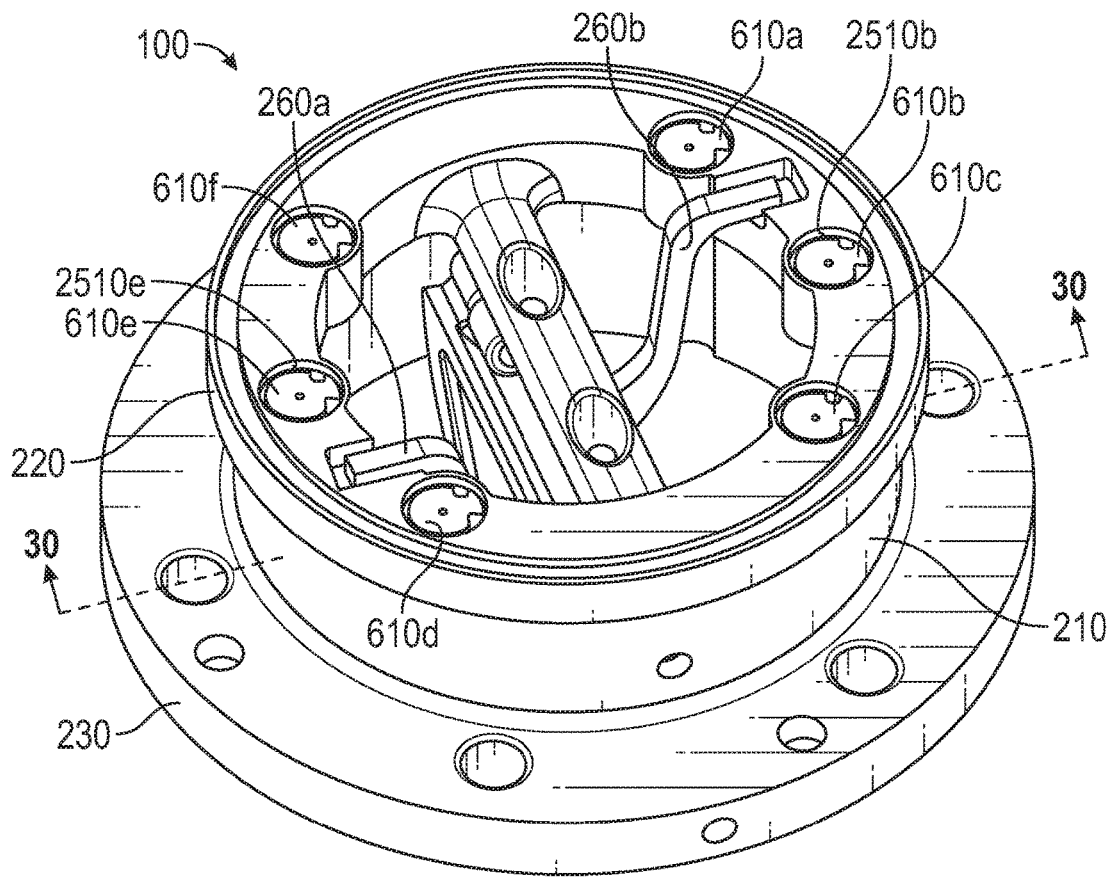
FIG. 28 is a top perspective view of a break check valve in accordance with another aspect of the current disclosure.
Figure 29:
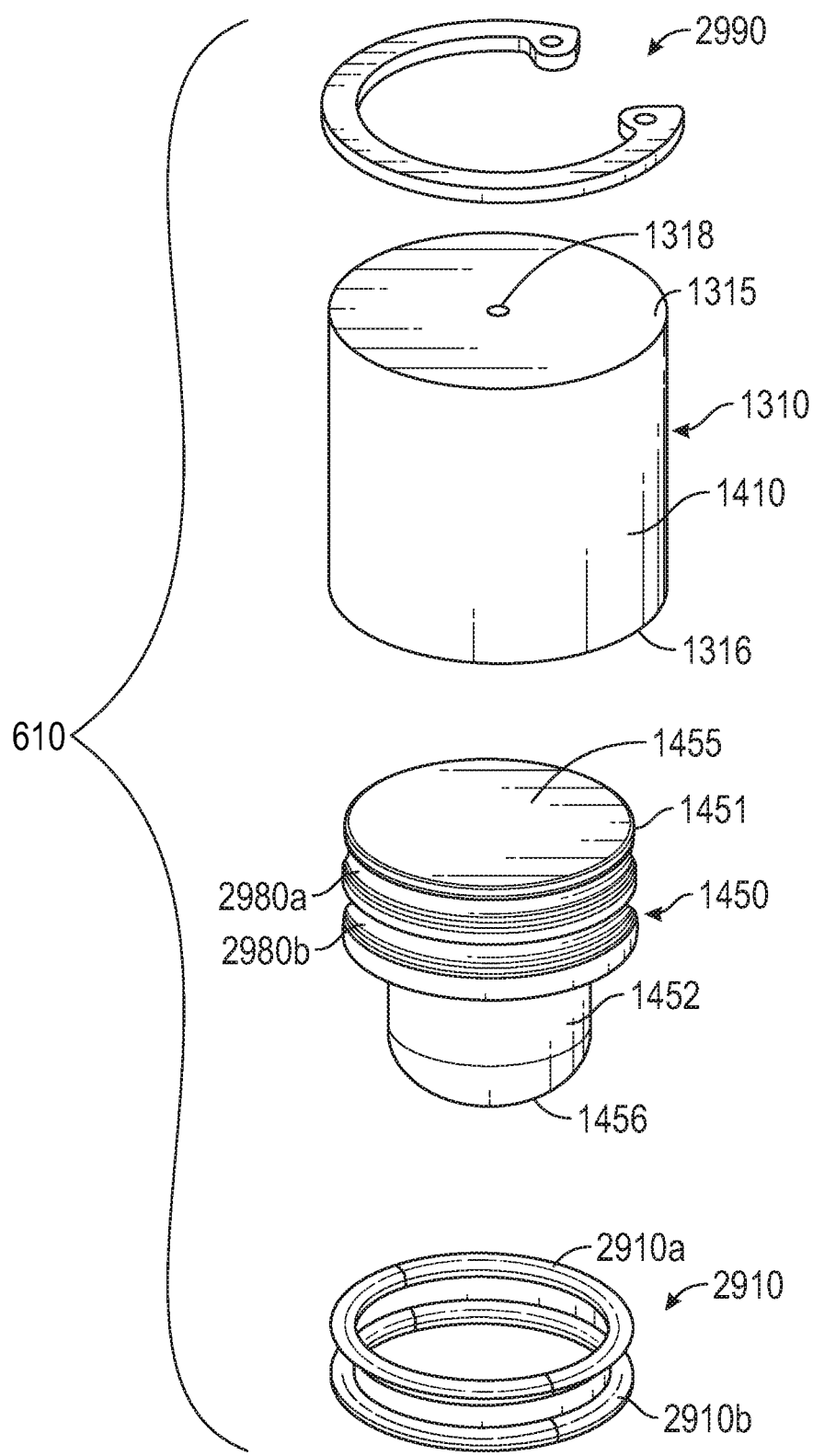
FIG. 29 is an exploded top perspective view of a dampener of the break check valve of FIG. 28.
Figure 30:
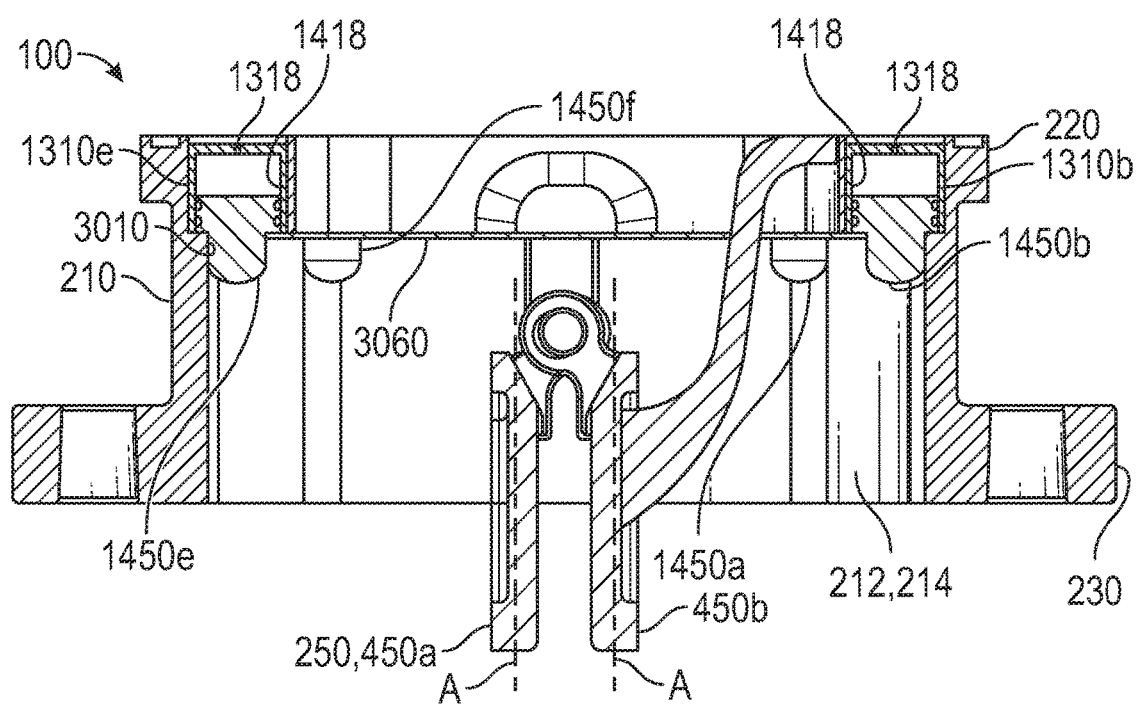
FIG. 30 is a sectional side view of the break check valve of FIG. 28 taken along line 30-30 of FIG. 28.

FIGS. 28-30 show the break check valve 100 in accordance with another aspect of the current disclosure. FIG. 28 specifically is a top perspective view of a break check valve 100 in the open position. Again, the valve 100 can comprise the plurality of dampeners 610a,b,c,d,e,f, which again can be positioned inside the holes 2510a,b,c,d,e,f (all shown but only 2510b,e marked) defined in the valve body 210.

FIG. 29 is an exploded top perspective view of one of the dampeners 610 of the break check valve 100 of FIG. 28. As shown, the dampener 610 can comprise the housing 1310 defining the housing wall 1410 and the orifice 1318. In some aspects, as shown, the housing 1310 can be separate from the valve body 210 (in contrast to the housing 1310 shown in FIG. 14, for example) and can define a first end 1315 and a second end 1316. The dampener 610 can further comprise the piston 1450, which can be sealed against the housing wall 1410 of the housing 1310 during operation with a seal 2910, which can comprise O-rings 2910a,b. The piston 1450 can define a first end 1455 and a second end 1456, a first portion 1451 and a second portion 1452. The O-rings 2910a,b can be sized to fit within grooves 2980a,b defined in the piston 1450 and more specifically the first portion 1451 of the piston 1450. The first portion 1451 of the piston 1450 can define an outer diameter that is greater than an outer diameter of the second portion 1452. Movement of the housing 1310 inside the corresponding hole 2510 of the valve body 210 can be fixed or restricted by a fastener 2990, which can be a retaining ring such as the internal retaining ring shown.

FIG. 30 is a sectional side view of the break check valve 100. Each piston such as the pistons 1450b,e of the respective dampeners 610b,e can be held captive on an outside edge of the piston 1450 by a shoulder 3010 defined in the valve inner cavity 214 and the valve bore 217 of the valve body 210 and also on an inside edge of the piston 1450 by a plate 3060, which can be secured inside the valve bore 217 of the valve body 210. Each of the dampeners 610a,b,c,d,e,f and the dampeners 610b,e in as shown can be positioned to dampen the plates 450a,b of the valve member 250 during closing of the valve 100. When approaching the closed position B, the plates 450a,b can not only contact the dampeners 610a,b,c,d,e,f as shown but can continue rotating past the closed position B, dampening the closure of the valve 100 in the process, which as noted above can reduce the risk of water hammer occurring in the system 50 upon the closing of the valve 100. Specifically, as described with respect to FIG. 14 above, the orifice 1318 in the housing 1310 of each dampener 610 can allow the fluid in the system 50 to escape from the cavity 1418 of the housing slowly enough to slow down or decelerate the plate 450. The plate 450b can then return to the closed position B. In other aspects, the cavity 1418 of each of the dampeners 610 can be filled with a food grade oil or other fluid, which can be different than the fluid that the system 50 is meant to store. In some aspects, as shown, the open position A can be with the plates 450a,b in a vertical orientation or in a substantially vertical orientation. The dampener 610 can effectively be a hydraulic piston positioned within the housing 1310 defining the orifice 1318, and the orifice 1318 can be sized to restrict flow of a fluid therethrough to produce a shock absorber effect through hydraulic dampening.

Figure 31:
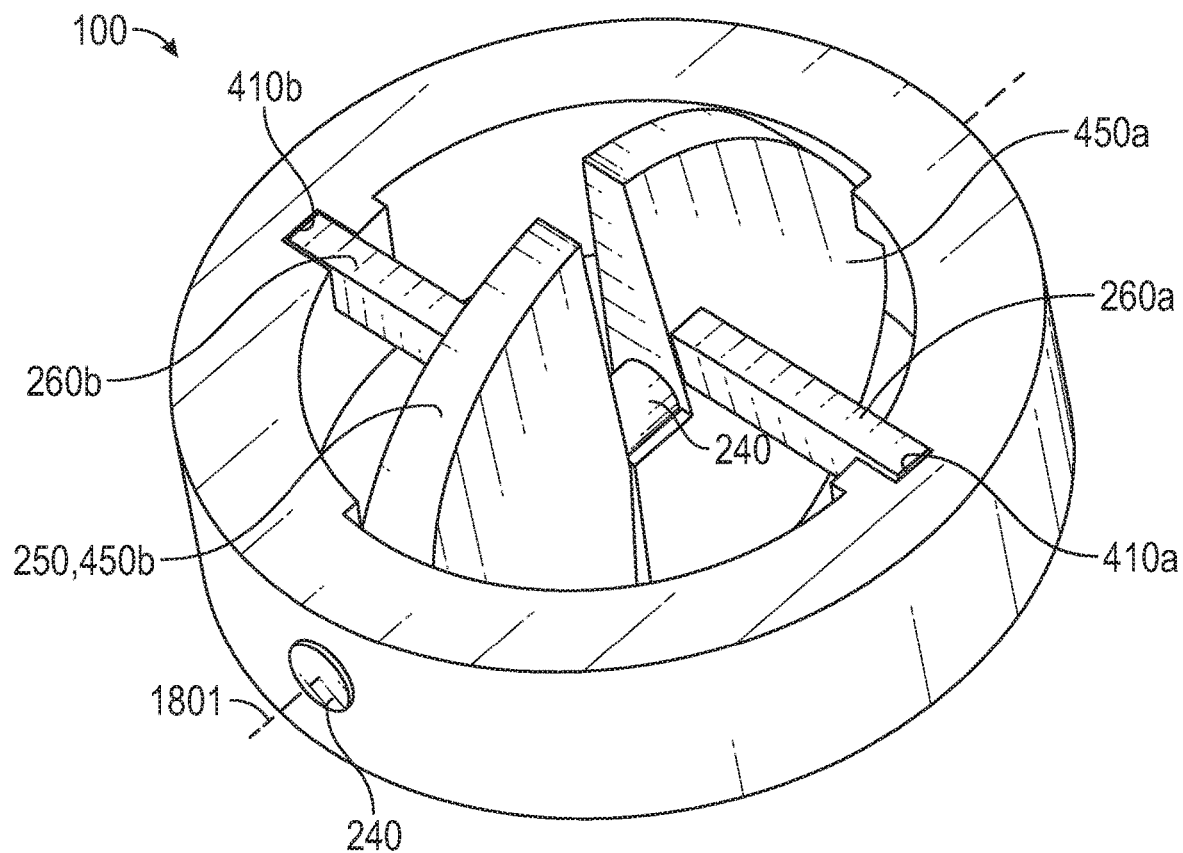
FIG. 31 is a top perspective view of a break check valve in accordance with another aspect of the current disclosure.
Figure 32:
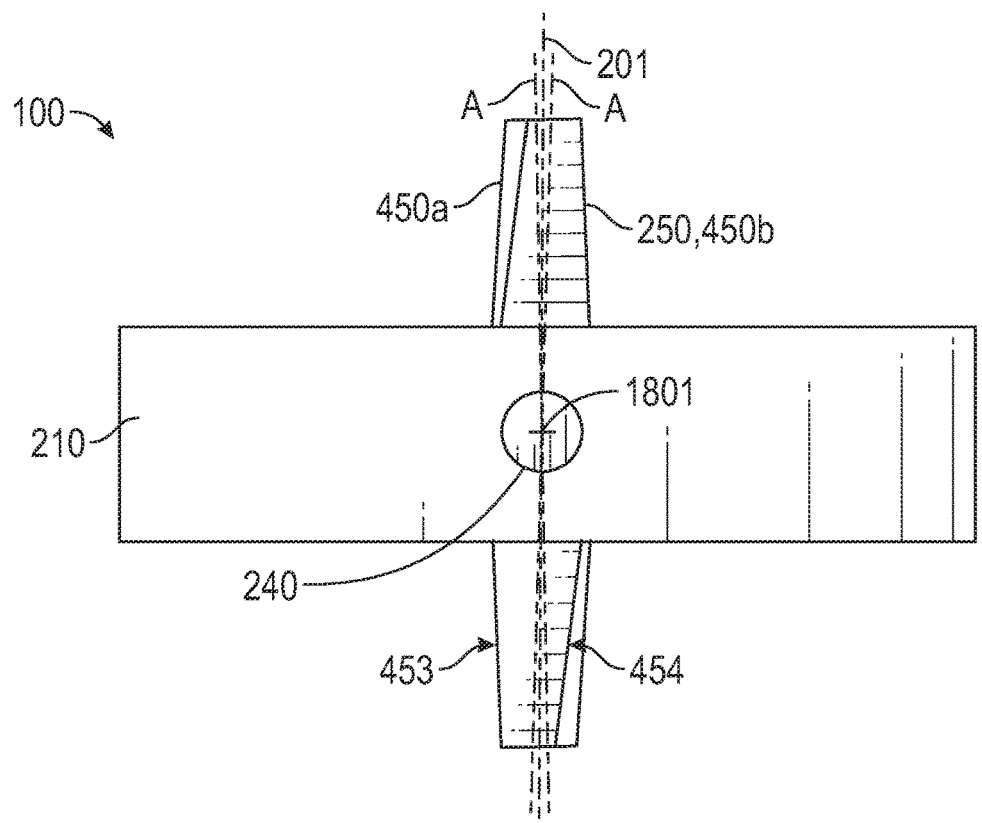
FIG. 32 is a side view of the break check valve of FIG. 31.

FIGS. 31-34 show the break check valve 100 in accordance with another aspect of the current disclosure. FIG. 31 specifically is a top perspective view and FIG. 32 is a side view of the break check valve 100 in the open position. Instead of the valve member 250 effectively being divided into two separate plates 450a,b along a line that is parallel to the pivot pin 240, as shown the valve member 250 can comprise plates 450a,b that are divided along a line that is perpendicular to the pivot pin 240 and the pivot axis 1801. As shown in FIG. 32, each of the plates 450a,b can taper from a center portion proximate to the pivot pin 240 towards a distal edge extending furthest from the valve body 210. As shown, each of the first side 453 and the second side 454 of each of the plates 450a,b can be facing the direction of flow of fluid through the valve 100, but also as shown the plates 450a,b—shown in the open position A for each—can still be biased ever so slightly in some aspects towards the closed position B by making the projected surface area of the second side 454 greater than the projected surface area of the first side 453 when viewing the plates 450a from along the axis 201 of the valve 100 with the plates 450a,b in the respective open positions A.

Figure 33:
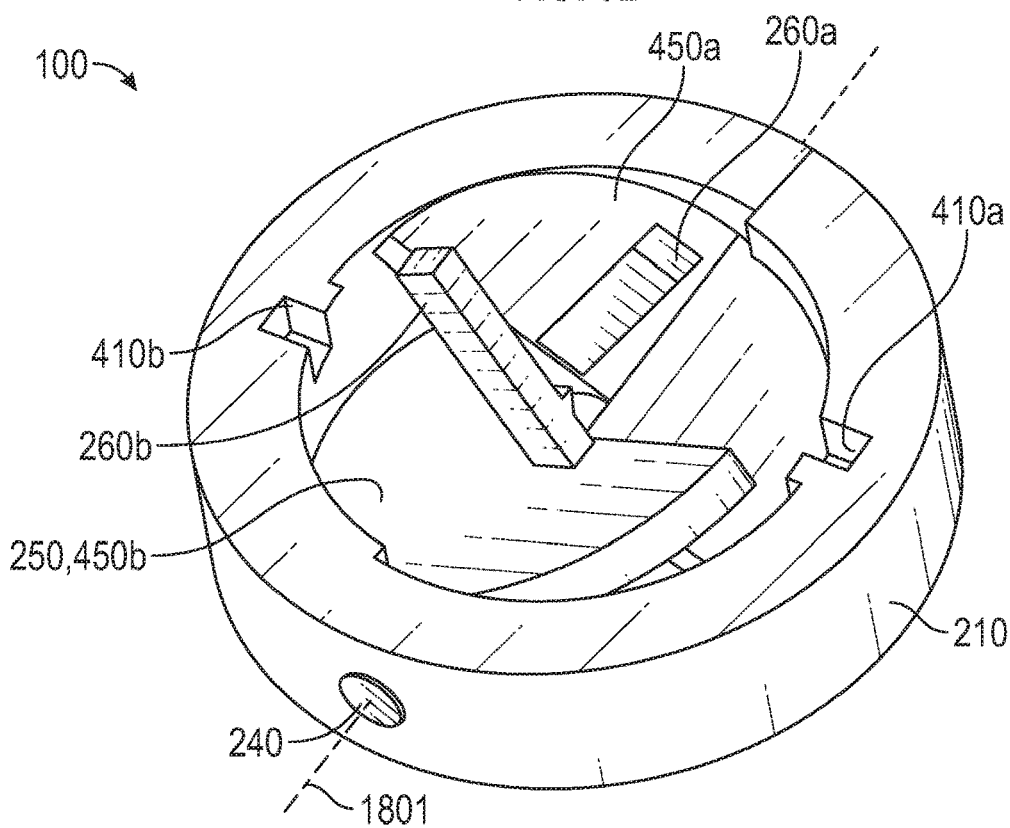
FIG. 33 is a top perspective view of the break check valve of FIG. 31 in a partially closed position.
Figure 34:
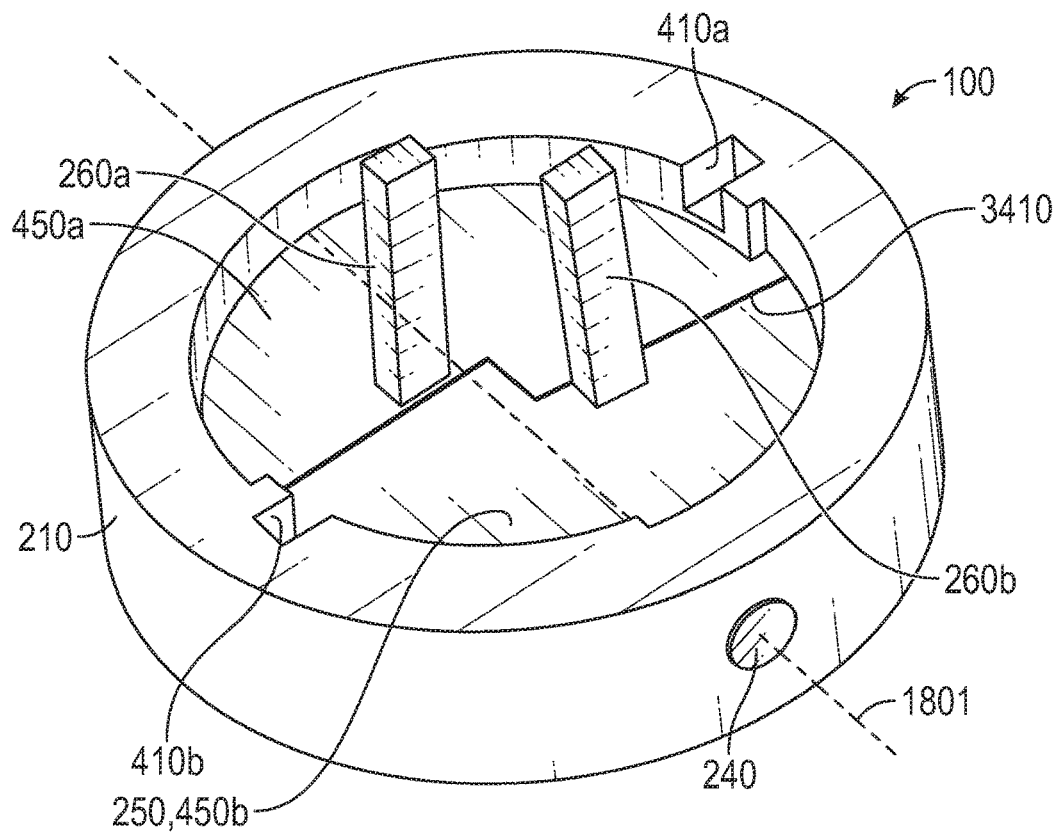
FIG. 34 is a top perspective view of the break check valve of FIG. 31 in a closed position.

FIG. 33 is a top perspective view of the break check valve 100 in a partially closed position, and FIG. 34 is a top perspective view of the break check valve 100 in the closed position. A seam 3410 can be defined where the plates 450a,b meet when in the closed position. In some aspects, the seam 3410 can be made tight to limit or stop water leakage therethrough. In other aspects, the seam 3410 can be made less tight or can define clear gaps to allow a limited amount of water to flow through as an indication to passersby that something may be amiss, specifically that the hydrant 80 may be dislocated from its usual position. In any case, the seam 3410 can define the plates 450a,b with, for example and without limitation, a lateral portion extending in a direction parallel to the pivot axis 1801. Due to the presence of the lateral portion of the seam 3410, an end of each plate 450a,b proximate to a stop (not shown but similar in construction and function to the ledge or stop 290 shown in FIG. 9 and configured to stop movement of the plates 450a,b where at least a portion of the valve body 210 is in contact with the plates 450a,b) can define a greater surface area than a surface area of the opposite end of the plates 450a,b, where both surface areas can together define a total surface area of the second side 454 (shown in FIG. 32) of the plates 450a,b. As the plates 450a,b begin to close, the fluid of the system 50 can push against each end of the second side 454 of each plate 450a,b. The smaller end can resist the larger end of each plate 450a,b, thereby slowing closure of the valve member 250.

Figure 35:
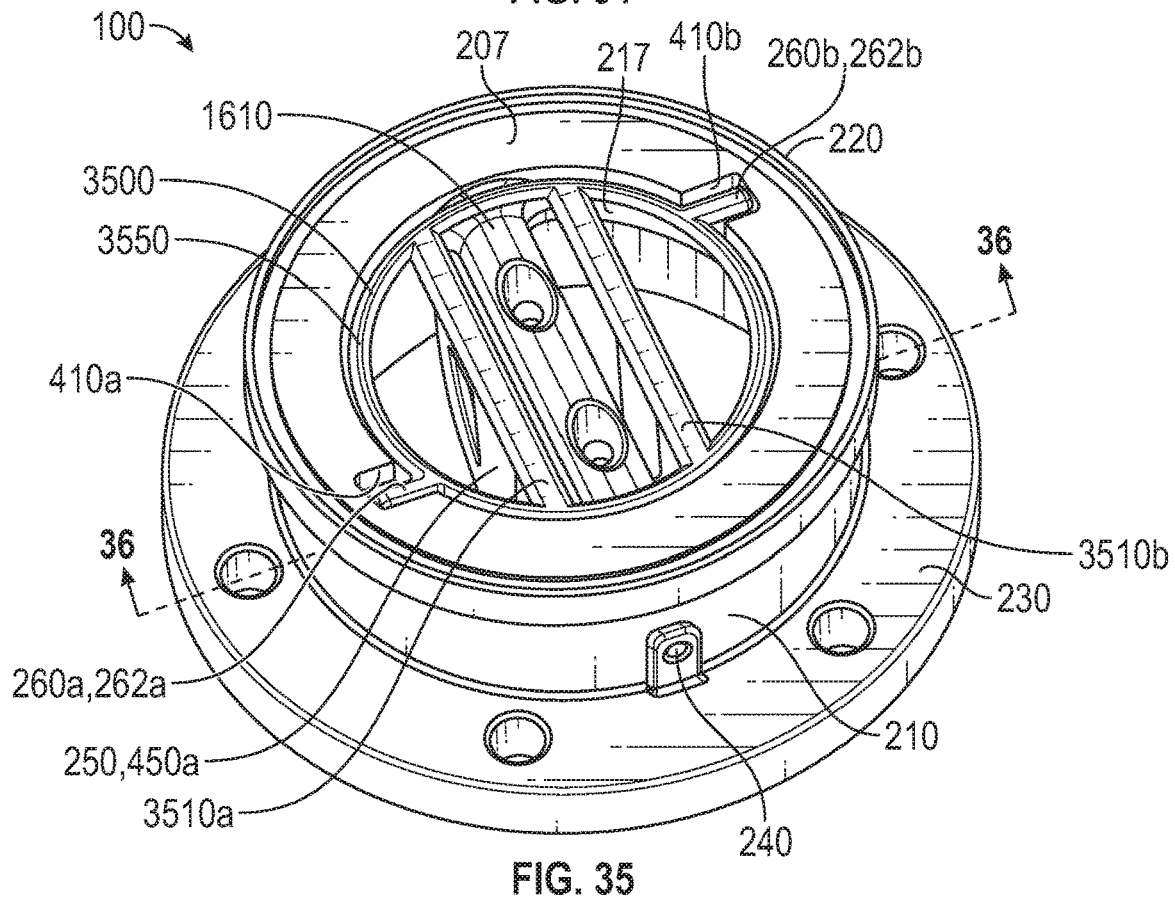
FIG. 35 is a top perspective view of a break check valve in accordance with another aspect of the current disclosure.

FIGS. 35-38 show the break check valve 100 in accordance with another aspect of the current disclosure. FIG. 35 specifically is a top perspective view of the break check valve 100, which can be configured similar to that disclosed above in various aspects. With respect to actuation of the valve 100, an insert such as a retention arm insert or hold-open bar 3500 of the valve member 250 can span the valve bore 217 of the valve body 210 and can comprise two arms 260a,b, each of which need not be incorporated into a single continuous member as shown in previous figures but rather can effectively be split into several elements. In some aspects, the hold-open bar 3500 can be a monolithic component. In other aspects, the hold-open bar 3500 can comprise multiple pieces. With respect to the arms 260a,b, the hold-open bar 3500, which can comprise a first horizontal member 3550 and cross members or second horizontal members 3510a,b, can comprise bases 264a,b (shown in FIG. 36) in contact with each of the plates 450a,b to lock the valve member 250 and specifically the plates 450a,b in the respective open positions A. The hold-open bar 3500 can further comprise distal portions or tips 262a,b, which can also be tabs and can be received within the stop notches 410a,b, and held down by the hydrant 80 in normal operation. In some aspects, as shown, the bases 264a,b can extend from the second horizontal members 3510.

In other aspects, either or both of the bases 264a,b can extend directly from the first horizontal member 3550, or the hold-open bar 3500 can be supported with only a portion of the first horizontal member 3550 or with another structure. In other aspects, the hold-open bar 3500 can cover and, optionally, extend slightly pass the cross member 1610 and, in any case, the bases 264a,b can curve around the cross member 1610 as necessary to reach the plates 450a,b and distal portions can reach in opposite directions to the stop notches 410a,b. The tips 262a,b and the bases 264a,b can together respectfully form one or more structural elements on each side of the cross member 1610. In some aspects, the first horizontal member 3550, the bases 264a,b, and the tips 262a,b can be roughly circular in cross-section or cylindrical in three dimensions. In other aspects, each of these portions of the hold-open bar 3500 need not be present and the hold-open bar 3500 need not define the closed ring shape shown. Furthermore, the stop notches 410a,b can be reoriented or increased or decreased in quantity. In some aspects, for example, the stop notches 410a,b are not required at all and can be replaced with a recessed ledge, which can extend partially or completely around an inner circumference of the top flange 220 of the valve body 210. In some aspects, the hold-open bar 3500 can comprise a quantity of one or two or more first horizontal members 3550 extending across the valve bore 217 of the valve body 210 defining a linear shape or orientation as opposed to the circular shape or orientation shown.

Figure 36:
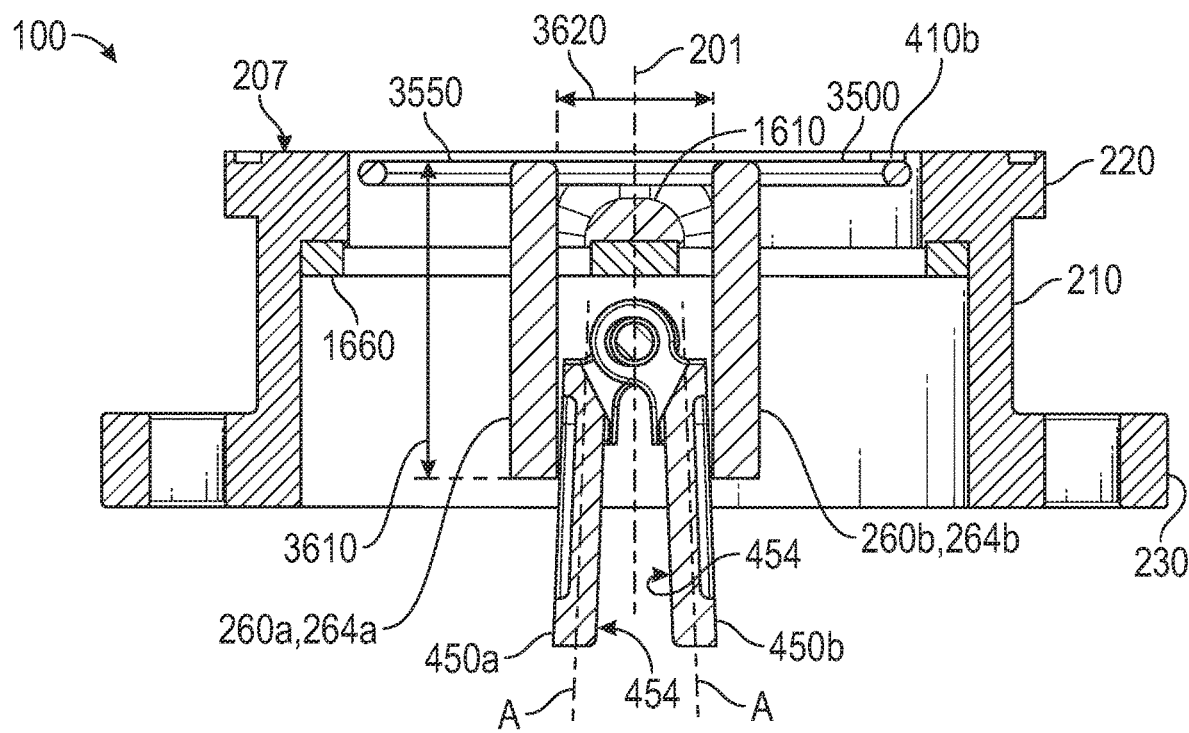
FIG. 36 is a sectional side view of the break check valve of FIG. 35 in an open position taken along line 36-36 of FIG. 35.

FIG. 36 is a sectional side view of the break check valve 100 in the open position and, more specifically, showing each of the plates 450a,b in the open position A. A length 3610 and spacing distance 3620 of the bases 264a,b of the arms 260a,b can be set as shown to sufficiently hold the plates 450a,b open against the force of the fluid inside the system 50 against the second side 454 of each plate 450a,b. At the same time, the length 3610 and the spacing distance 3620 can be set to not extend down the plates 450a,b so far that the hold-open bar 3500 will remain bound even upon dislocation of the hydrant 80 because the force component in the axial direction with respect to the axis 201 is not sufficient to expel the hold-open bar 3500.

Figure 37:
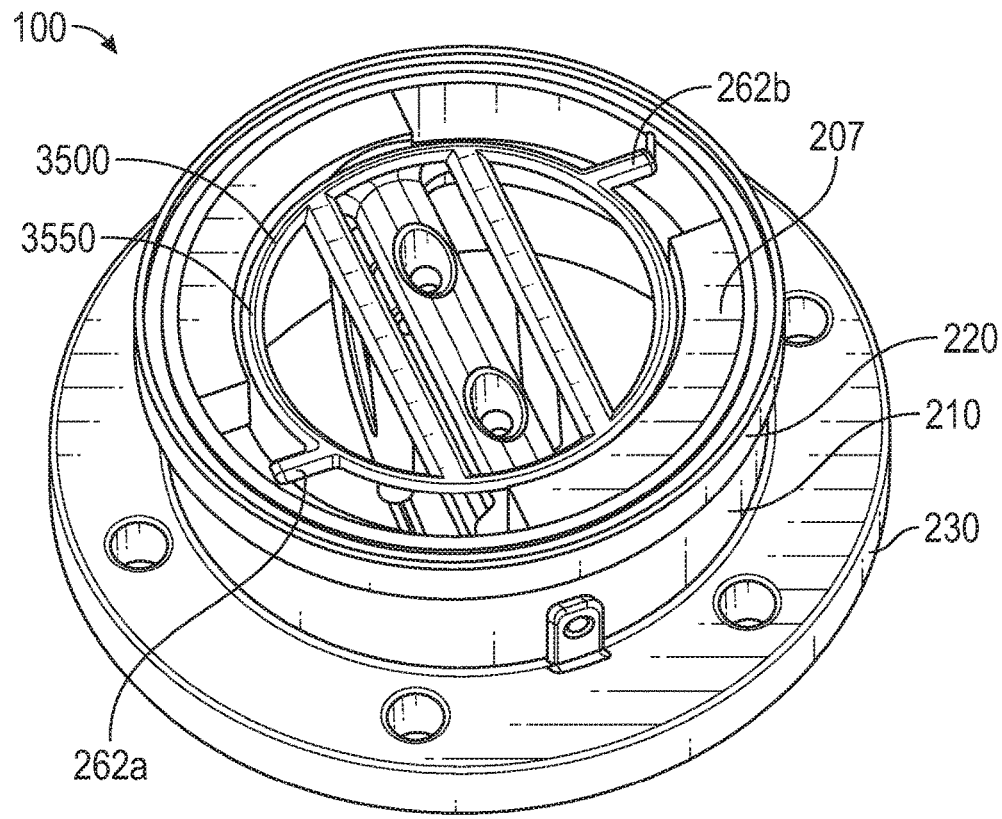
FIG. 37 is a top perspective view of a break check valve in accordance with another aspect of the current disclosure.

FIG. 37 is a top perspective view of the break check valve 100 in accordance with yet another aspect of the current disclosure. Instead of the stop notches 410a,b defined in the mating surface 207 of the valve body, the mating surface 207 can be removed and the tips 262a,b not supported except from above by the mounting flange 85 (shown in FIG. 1) of the hydrant 80.

Figure 38:
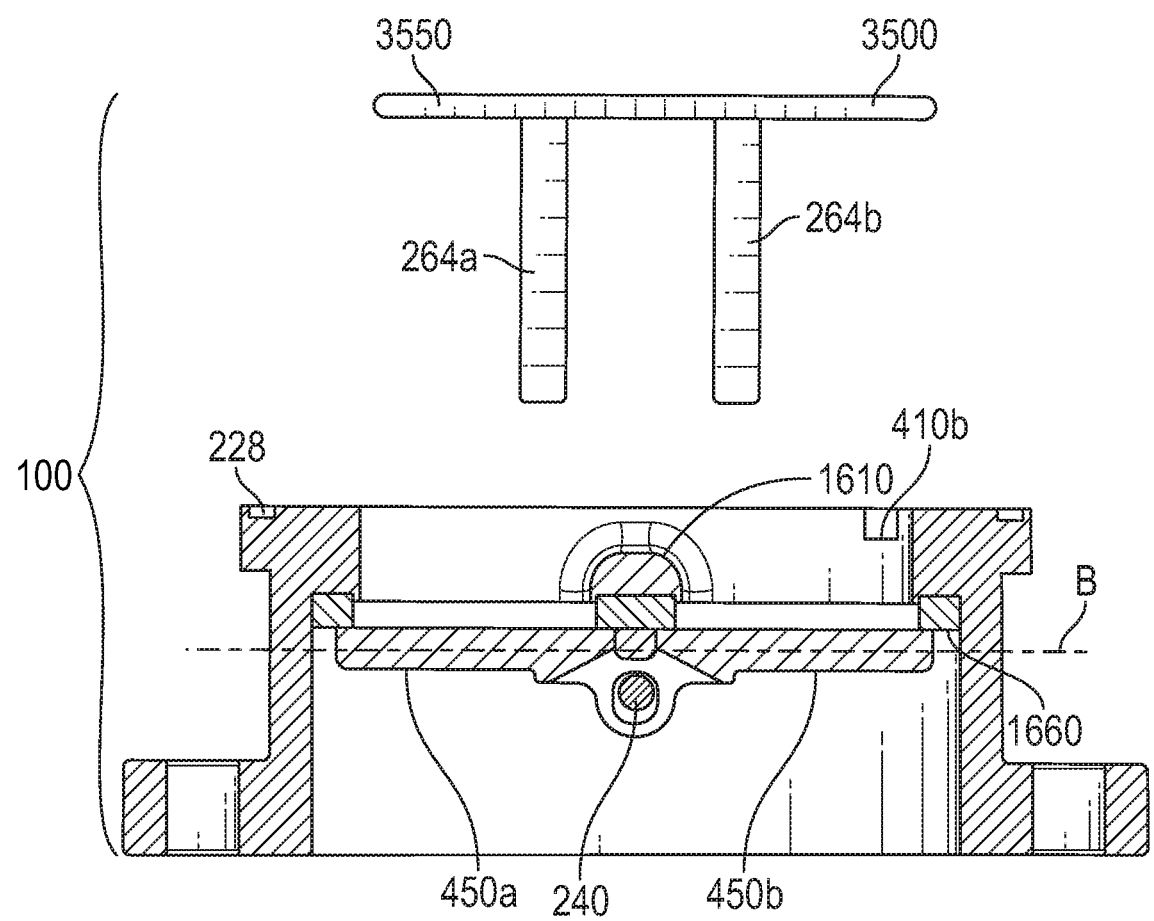
FIG. 38 is a sectional side view of the break check valve of FIG. 35 in a closed position and taken along line 36-36 of FIG. 35.

FIG. 38 is a sectional side view of the break check valve 100 in the closed position. Dislocation of the hydrant 80 can cause the arm 260 to also become dislocated from within the valve body 210 and from the valve 100 entirely and can then allow the valve member 250 and the valve 100 to move to the closed position B shown.

A method for using the hydrant 80 can comprise providing a wet barrel hydrant 80 comprising a hydrant body and a break check valve 100 coupled to the hydrant 80 and positioned below the hydrant 80. Each of the hydrant 80 and the valve 100 can be coupled to the system 50, which can comprise a fluid therein under pressure. The method can comprise automatically rotating the valve member 250 of the valve 100 from an open position to a closed position of the valve 100 when the hydrant 80 is separated from the valve 100, the valve member 250 before closure positioned inside the valve body 210 of the valve 100, the valve member 250 during closure changing its position with respect to the valve body 210 of the valve 100, the valve member 250 in the closed position of the valve 100 substantially stopping flow of the fluid from the system 50. By "substantially stopping flow," it is meant that all flow is stopped except for any incidental flow from valve due to minor gaps between the parts when the valve is closed and any purposeful venting or streaming of water as described below—such as to alert passersby of a problem with the hydrant 80. In some aspects, leakage due to gaps and any purposeful venting of water as described will measure less than 5% of total flow.

The method can further comprise expelling a limited stream of water from the valve 100 in the closed position through the hole(s) 1618 defined in a one of the valve body 210 and the valve member 250 to indicate closure of the valve 100. In some aspects, the method can comprise expelling a stream of water from the valve 100 and through the cross member 1610 or the valve member 250 of the valve 100. For example, the stream of water could be a focused jet extending high enough into the air (a minimum of five feet, in some aspects, to reach above a top of a parked vehicle) for one to notice it. In some aspects, the method can comprise expelling the stream of water from the valve 100 and through a gap defined between the cross member 1610 or the valve member 250 and the valve body 210 of the valve 100. By expelling water from the valve 100 when the valve 100 is closed, the valve can, as noted above, effectively and clearly indicate to passersby that something may be amiss with the hydrant 80 and specifically that the hydrant 80 may be dislocated from its usual position, giving them and any nearby public safety personnel the ability to notify responsible parties that the hydrant 80 requires attention.

In some aspects, as described above, rotating the valve member 250 of the valve 100 can comprise rotating a single valve disc such as the plate 450 about the pivot pin 240 of the valve 100 from the open position A to the closed position B. In any case, the valve disc or valve member 250 can extend substantially in all directions across the valve bore 217 defined in the valve body 210 when the valve 100 is in the closed position B. In other aspects, rotating the valve member 250 of the valve 100 can comprise rotating a pair of valve discs or plates 450a,b about the pivot pin 240 of the valve 100 from the open position A to the closed position B.

In some aspects, rotating the valve member 250 of the valve 100 can comprise expelling the hold-open bar 3500 from the valve 100 and thereby allowing rotation of the valve member 250 within the valve body 210 from the open position A to the closed position B. Furthermore, rotating the valve member 250 of the valve 100 can comprise slowing the speed of the valve member 250 proximate to the closed position B. In some aspects, slowing the speed of the valve member 250 can comprise contacting the valve member 250 with a biasing member 720. In other aspects, slowing the speed of the valve member 250 comprises contacting the valve member 250 with a hydraulic piston such as found in the dampener 610 and configured to move within a cylinder comprising the fluid, the cylinder defining an orifice, the orifice sized to restrict flow of the fluid and thereby slow the valve member.

The method can comprise installing the hydrant 80 at any angular position about the axis 201 with respect to an angular position of the valve 100 without affecting the ability of the valve 100 to remain closed when the hydrant 80 is coupled to the valve 100 and open when the hydrant 80 is separated from the valve 100. This rotation of the hydrant 80 to a desirable angular position based on the availability of multiple angular positions is called "clocking" of the hydrant 80. The method can comprise re-using the valve 100 as-is after actuation of the valve 100 and after coupling a replacement hydrant 80 to the valve 100.

In some aspects, the valve 100 and various components thereof can be formed from or comprise an iron, bronze, or steel material including stainless steel or even a plastic (e.g., polymeric) or composite material, which can be reinforced with fibers. In other aspects, any suitable materials can be used.

As shown, the break check valve 100 can be easily replaced by a new valve 100, or the valve 100 can replace an older style valve or be installed where no break check valve is currently installed. The valve 100 can also be reset without replacement or modification upon reinstallation of the hydrant 80 by returning the components of the valve 100 to their respective original positions. Significant weight and cost savings can be achieved with a valve such as the valve 100 disclosed herein. One older style break check valve, for example, can weigh up to 200 pounds or more and require that the installation height 480 (shown in FIG. 4) from end to end in the axial direction be approximately two feet or more. In contrast, the break check valve 100 disclosed herein can weigh as little as approximately 40 pounds and the installation height 480 can measure as little as about two inches.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A hydrant comprising:
   a hydrant body defining a hydrant inner cavity, the hydrant body configured to couple to and be in fluid communication with a fluid distribution system comprising a fluid therein under pressure; and a break check valve coupled to the hydrant body, the valve comprising:
- a valve body defining a valve inner cavity, the valve inner cavity defining a valve bore in fluid communication with the fluid during normal operation of the hydrant, the valve body comprising a cross member;
- a valve member configured to rotate from an open position to a closed position of the valve; and
- an arm in contact with the hydrant body and configured to prevent movement of the valve member when the hydrant body is coupled to the valve, the cross member of the valve body defining a hole separate from the valve bore and in fluid communication with each of the hydrant inner cavity and the valve inner cavity.

2. The hydrant of claim 1, wherein the cross member is monolithic with the valve body.

3. The hydrant of claim 1, wherein the valve member is a plate, the arm extending from the plate, the arm positioned entirely within the valve body when the valve is in the open position.

4. The hydrant of claim 1, wherein the hydrant is capable of being installed along a vertical axis in any one of multiple angular positions with respect to an angular position of the valve, the valve configured to remain open when the hydrant body is coupled to the valve and remain closed when the hydrant body is separated from the valve.

5. A break check valve for a hydrant, the valve comprising:
- a valve body comprising a mating surface and a valve inner cavity defining a valve bore, the valve body further comprising a cross member;
- a valve member positioned within the valve body and configured to rotate about a pivot pin from an open position to a closed position of the valve, the valve member configured to remain in the open position of the valve as long as a mating surface of the hydrant substantially matching the mating surface of the valve body remains in contact with the mating surface of the valve body, the valve member further configured to close when the mating surface of the hydrant is separated from the mating surface of the valve body; and
- at least one arm, the cross member of the valve body defining a hole separate from the valve bore and in fluid communication with a portion of the valve inner cavity on either side of the valve member when in the closed position of the valve.

6. The valve of claim 5, wherein the hole in the cross member extends from a top surface to a bottom surface of the cross member.

7. The valve of claim 5, wherein the cross member is formed monolithically with the valve body.

8. The valve of claim 5, wherein the valve member further comprises a hold-open bar, the at least one arm comprising two arms, the two arms extending from the hold-open bar, the hold-open bar separable from the valve upon dislocation of a hydrant from the mating surface of the valve.

9. The valve of claim 5, wherein the valve comprises a dampener configured to slow a speed of the valve member when the valve member is proximate to the closed position.

10. The valve of claim 9, wherein the dampener comprises a biasing member.

11. The valve of claim 9, wherein the dampener comprises a hydraulic piston positioned within a cylinder defining an orifice, the orifice sized to restrict flow of a fluid therethrough.

12. The valve of claim 5, wherein the at least one arm extends from the valve member.

13. The valve of claim 5, wherein the pivot pin is offset in a radial direction from and relative to an axis of the valve, the axis being defined by the valve bore.

14. A method for using a hydrant, the method comprising:
- providing a wet barrel hydrant comprising a hydrant body and a hydrant break check valve coupled to the hydrant and positioned below the hydrant, the hydrant defining a hydrant inner cavity and the valve defining a valve inner cavity defining a valve bore, each of the hydrant and the valve coupled to a fluid distribution system comprising a fluid therein under pressure;
- rotating a valve member of the valve from an open position to a closed position of the valve when the hydrant is separated from the valve, the valve member before closure positioned inside a valve body of the valve, the valve member during closure changing its position with respect to the valve body of the valve, the valve member in the closed position of the valve substantially stopping flow of the fluid from the fluid distribution system; and
- expelling a stream of water from the valve in the closed position through a hole defined in a cross member of the valve, the hole separate from the valve bore and in fluid communication with each of the hydrant inner cavity and the valve inner cavity to indicate closure of the valve.

15. The method of claim 14, wherein rotating the valve member of the valve comprises rotating a single valve disc about a pivot pin of the valve from the open position to the closed position, the valve disc extending across the valve bore and configured to stop flow of the fluid therethrough when the valve is in the closed position.

16. The method of claim 14, wherein rotating the valve member of the valve comprises rotating a pair of valve discs about a pivot pin of the valve from the open position to the closed position.

17. The method of claim 14, wherein rotating the valve member of the valve comprises expelling a retention arm insert from the valve and thereby allowing rotation of the valve member within the valve body from the open position to the closed position.

18. The method of claim 14, wherein rotating the valve member of the valve comprises slowing a speed of the valve member when the valve member is proximate to the closed position.

19. The method of claim 18, wherein slowing the speed of the valve member comprises contacting the valve member with a biasing member.

20. The method of claim 18, wherein slowing the speed of the valve member comprises contacting the valve member with a hydraulic piston configured to move within a cylinder comprising the fluid, the cylinder defining an orifice, the orifice sized to restrict flow of the fluid and thereby slow the valve member.

* * * * *